US012609075B2

(12) United States Patent
Kwon et al.

(10) Patent No.: US 12,609,075 B2
(45) Date of Patent: Apr. 21, 2026

(54) PIXEL IN PIXEL ARRAY, METHOD OF OPERATING PIXEL, DRIVING CIRCUIT FOR DRIVING PIXEL ARRAY, AND DISPLAY DEVICE

(71) Applicant: SAMSUNG ELECTRONICS CO., LTD., Suwon-si (KR)

(72) Inventors: Taehyeon Kwon, Suwon-si (KR); Sungmok Lee, Suwon-si (KR); Yongil Kwon, Suwon-si (KR); Sunkwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/006,931

(22) Filed: Dec. 31, 2024

(65) Prior Publication Data

US 2025/0363943 A1 Nov. 27, 2025

(30) Foreign Application Priority Data

May 21, 2024 (KR) ........................ 10-2024-0065912

(51) Int. Cl.
*G09G 3/3225* (2016.01)
*G09G 3/20* (2006.01)

(52) U.S. Cl.
CPC ......... *G09G 3/3225* (2013.01); *G09G 3/2014* (2013.01); *G09G 2320/0233* (2013.01); *G09G 2320/064* (2013.01)

(58) Field of Classification Search
None
See application file for complete search history.

(56) References Cited

U.S. PATENT DOCUMENTS 5,619,228 A * 4/1997 Doherty .................... G09G 3/34 345/89
5,969,710 A * 10/1999 Doherty ............... G09G 3/2007 348/E5.142

(Continued)

FOREIGN PATENT DOCUMENTS

KR 10-2007-0089017 A 8/2007
KR 10-2378251 B1 3/2022
KR 10-2378259 B1 3/2022

OTHER PUBLICATIONS

Takenobu Usui et al., "A digital driving method using pulse-density modulation with a random dither matrix for higher motion image quality", Journal of the Society for Information Display, vol. 30, Issue 3, Mar. 2022 (published Nov. 2021), pp. 198-208, DOI: 10.1002/jsid.1087.

*Primary Examiner* — Sepehr Azari
(74) *Attorney, Agent, or Firm* — Sughrue Mion, PLLC

(57) ABSTRACT

Provided is a display device including a pixel array including a plurality of pixels arranged in a matrix. Each pixel includes a pulse width modulation (PWM) circuit and an emission device; a data driver configured to provide pixel data to pixels arranged in a row of the pixel array; and a row driver configured to generate control signals and clock signals for driving the pixel array. The PWM circuit is configured to generate the PWM signal based on the control signals and the clock signals, the PWM signal including a plurality of bit fields respectively corresponding to a plurality of bits of the pixel data. The PWM circuit is further configured to, in a PWM period in which the PWM signal is output, distribute a first bit field of the PWM signal corresponding to a most significant bit (MSB) of the pixel data, among the plurality of bit fields.

19 Claims, 15 Drawing Sheets

(56) References Cited

U.S. PATENT DOCUMENTS

| | | | | | |
|---|---|---|---|---|---|
| 5,986,640 | A * | 11/1999 | Baldwin | G09G 3/2033 348/E5.142 |
| 6,140,983 | A * | 10/2000 | Quanrud | G02F 1/136 345/55 |
| 6,151,011 | A * | 11/2000 | Worley, III | G09G 3/2029 345/692 |
| 6,339,417 | B1 | 1/2002 | Quanrud | |
| 6,372,608 | B1 | 4/2002 | Shimoda et al. | |
| 6,645,830 | B2 | 11/2003 | Shimoda et al. | |
| RE38,466 | E | 3/2004 | Inoue et al. | |
| 6,818,465 | B2 | 11/2004 | Biwa et al. | |
| 6,818,530 | B2 | 11/2004 | Shimoda et al. | |
| 6,858,081 | B2 | 2/2005 | Biwa et al. | |
| 6,967,353 | B2 | 11/2005 | Suzuki et al. | |
| 6,972,773 | B2 * | 12/2005 | Matsui | G09G 3/2033 345/82 |
| 7,002,182 | B2 | 2/2006 | Okuyama et al. | |
| 7,084,420 | B2 | 8/2006 | Kim et al. | |
| 7,087,932 | B2 | 8/2006 | Okuyama et al. | |
| 7,154,124 | B2 | 12/2006 | Han et al. | |
| 7,208,725 | B2 | 4/2007 | Sherrer et al. | |
| 7,288,758 | B2 | 10/2007 | Sherrer et al. | |
| 7,319,044 | B2 | 1/2008 | Han et al. | |
| 7,391,391 | B2 | 6/2008 | Ohshima | |
| 7,501,656 | B2 | 3/2009 | Han et al. | |
| 7,709,857 | B2 | 5/2010 | Kim et al. | |
| 7,759,140 | B2 | 7/2010 | Lee et al. | |
| 7,781,727 | B2 | 8/2010 | Sherrer et al. | |
| 7,790,482 | B2 | 9/2010 | Han et al. | |
| 7,940,350 | B2 | 5/2011 | Jeong | |
| 7,959,312 | B2 | 6/2011 | Yoo et al. | |
| 7,964,881 | B2 | 6/2011 | Choi et al. | |
| 7,985,976 | B2 | 7/2011 | Choi et al. | |
| 7,994,525 | B2 | 8/2011 | Lee et al. | |
| 8,008,683 | B2 | 8/2011 | Choi et al. | |
| 8,013,352 | B2 | 9/2011 | Lee et al. | |
| 8,049,161 | B2 | 11/2011 | Sherrer et al. | |
| 8,129,711 | B2 | 3/2012 | Kang et al. | |
| 8,179,938 | B2 | 5/2012 | Kim | |
| 8,263,987 | B2 | 9/2012 | Choi et al. | |
| 8,324,646 | B2 | 12/2012 | Lee et al. | |
| 8,399,944 | B2 | 3/2013 | Kwak et al. | |
| 8,432,511 | B2 | 4/2013 | Jeong | |
| 8,459,832 | B2 | 6/2013 | Kim | |
| 8,502,242 | B2 | 8/2013 | Kim | |
| 8,536,604 | B2 | 9/2013 | Kwak et al. | |
| 8,614,722 | B2 | 12/2013 | Ozaki | |
| 8,624,804 | B2 | 1/2014 | Ryu et al. | |
| 8,735,931 | B2 | 5/2014 | Han et al. | |
| 8,766,295 | B2 | 7/2014 | Kim | |
| 9,818,337 | B2 * | 11/2017 | Li | G09G 3/32 |
| 2002/0003542 | A1 * | 1/2002 | Tanaka | G09G 3/2033 345/581 |
| 2002/0012008 | A1 * | 1/2002 | Takagi | G09G 3/2085 345/691 |
| 2002/0047852 | A1 * | 4/2002 | Inukai | G09G 3/3266 257/E27.111 |
| 2004/0012551 | A1 * | 1/2004 | Ishii | G09G 3/3648 345/87 |
| 2007/0171507 | A1 * | 7/2007 | Ishii | H04N 9/3114 348/E5.142 |
| 2007/0188243 | A1 * | 8/2007 | Waheed | H03L 7/101 331/16 |
| 2010/0039356 | A1 | 2/2010 | Kimura | |
| 2010/0091050 | A1 * | 4/2010 | El-Ghoroury | H04N 9/3164 345/83 |
| 2011/0018914 | A1 * | 1/2011 | Ishikawa | G09G 3/3426 345/691 |
| 2013/0076801 | A1 * | 3/2013 | Yoshinaga | G09G 3/2033 345/690 |
| 2016/0027385 | A1 * | 1/2016 | Li | G09G 3/32 345/82 |
| 2020/0202773 | A1 * | 6/2020 | Genoe | G09G 3/3275 |
| 2022/0335882 | A1 * | 10/2022 | Kwon | G09G 3/3266 |
| 2022/0415245 | A1 * | 12/2022 | Lee | G09G 3/2014 |
| 2023/0005420 | A1 * | 1/2023 | Lee | G09G 3/2022 |
| 2024/0282229 | A1 * | 8/2024 | Jung | G09G 3/2081 |
| 2025/0308442 | A1 * | 10/2025 | Jung | G09G 3/2081 |
| 2025/0316209 | A1 * | 10/2025 | Lee | G09G 3/2014 |

* cited by examiner

PIXEL IN PIXEL ARRAY, METHOD OF OPERATING PIXEL, DRIVING CIRCUIT FOR DRIVING PIXEL ARRAY, AND DISPLAY DEVICE

CROSS-REFERENCE TO RELATED APPLICATION

This application is based on and claims priority under 35 U.S.C. § 119 to Korean Patent Application No. 10-2024-0065912, filed on May 21, 2024, in the Korean Intellectual Property Office, the disclosure of which is herein incorporated by reference in its entirety.

BACKGROUND

One or more example embodiments of the disclosure relate to a semiconductor device, and more particularly, to pixels of a pixel array provided in a display device and a method of driving the pixels.

As the information society develops, the demand for display devices that display images is increasing, and various types of display devices such as liquid crystal display devices, plasma display devices, and organic light-emitting display devices are being used. In particular, interest in display devices using micro light-emitting diodes (LEDs) is increasing.

In order to improve the characteristics of display devices that are used to implement virtual reality (VR), augmented reality (AR), and mixed reality (MR) technologies, the development of a micro LED on Silicon or an active matrix-type organic light emitting diode (AMOLED) on Silicon is increasing. In particular, pixel arrays that implement high-resolution and high-quality images and methods of driving the pixel arrays are being researched.

SUMMARY active matrix-type organic light emitting diode provide a display device that prevents image quality deterioration due to a false contour effect, pixels of a pixel array provided in the display device, and a method of driving the pixels.

According to an aspect of an example embodiment of the disclosure, there is provided a display device including: a pixel array including a plurality of pixels arranged in a matrix, wherein each pixel of the plurality of pixels includes a pulse width modulation (PWM) circuit configured to generate a PWM signal and an emission device configured to emit a light based on an ON level of the PWM signal; a data driver configured to provide pixel data to pixels arranged in a row of the pixel array; and a row driver configured to generate control signals and clock signals for driving the pixel array, wherein the PWM circuit is configured to generate the PWM signal based on the control signals and the clock signals, the PWM signal including a plurality of bit fields respectively corresponding to a plurality of bits of the pixel data; and wherein the PWM circuit is further configured to, in a PWM period in which the PWM signal is output, distribute a first bit field of the PWM signal corresponding to a most significant bit (MSB) of the pixel data, among the plurality of bit fields.

According to another aspect of an example embodiment of the disclosure, there is provided a driving circuit for driving a pixel array including a plurality of pixels, the driving circuit including: a data driver configured to provide pixel data to the plurality of pixels; and a row driver configured to generate and provide clock signals and control signals to the pixel array and control a pixel of the plurality of pixels based on the clock signals and the control signals, such that a bit field corresponding to a most significant bit (MSB) of the pixel data from among a plurality of bit fields included in a luminance control signal of the pixel scrambles between two or more lower bit fields among bit fields corresponding to remaining bits of the pixel data.

According to another aspect of an example embodiment of the disclosure, there is provided a method of operating a pixel provided in a pixel array of a display device and including an emission device, the method including in a first period, storing received pixel data, and, in a second period, outputting a plurality of bits of the pixel data as a PWM signal, upon which an emission and a non-emission of the emission device are controlled, wherein, in the second period, an MSB from among the plurality of bits is output a plurality of number of times, and each of bits other than the MSB from among the plurality of bits is output once.

According to another aspect of the disclosure, there is provided a pixel provided in a pixel array of a display device, the pixel including: an emission device of which a luminance is controlled based on a pulse width modulation (PWM) signal; and a PWM circuit configured to generate the PWM signal. The PWM circuit includes: a storage device configured to store and output a most significant bit (MSB) from among a plurality of bits of received pixel data; a serial shift circuit configured to store and output bits other than the MSB from among the plurality of bits; and an output selection circuit configured to receive a first bit from the serial shift circuit, receive the MSB from the storage device, and output the MSB or the first bit as the PWM signal in response to a selection signal.

BRIEF DESCRIPTION OF THE DRAWINGS

Example embodiments of the disclosure will be more clearly understood from the following detailed description taken in conjunction with the accompanying drawings in which.

DETAILED DESCRIPTION

Hereinafter, example embodiments of the disclosure inventive concept will be described in detail with reference to the accompanying drawings.

Figure 1:
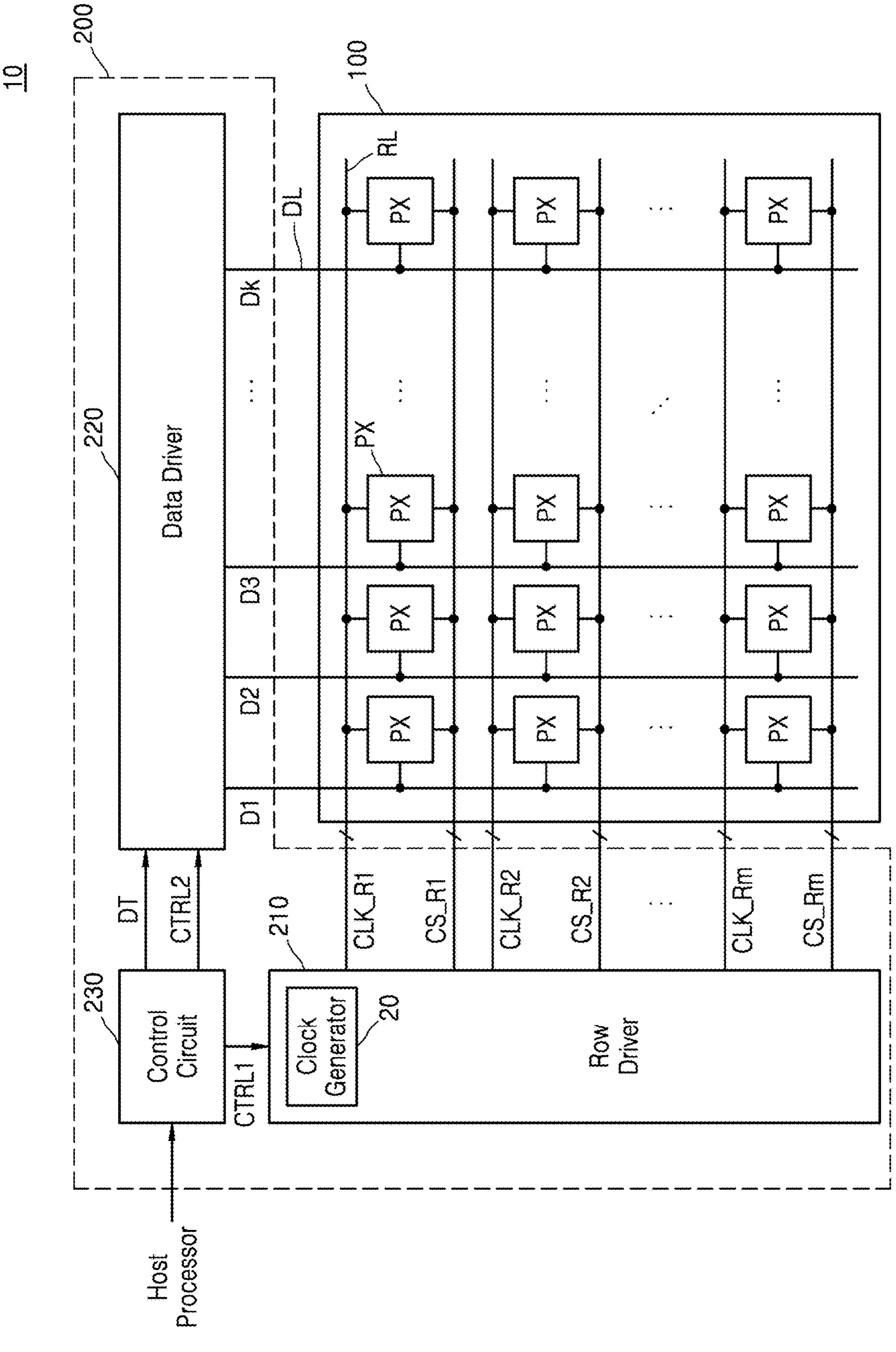
FIG. 1 is a schematic view of a display device according to an example embodiment.

FIG. 1 is a schematic view of a display device according to an example embodiment.

A display device 10 of FIG. 1 may be mounted on an electronic device that is configured to display an image. For example but not limited thereto, the electronic device may be any one of a smart phone, a tablet personal computer (PC), an e-book reader, a desktop PC, a laptop PC, a netbook computer, a portable multimedia player (PMP), an MP3 player, a mobile medical device, a camera, a wearable device (e.g. a head-mounted-device (HMD) such as electronic glasses, an electronic clothing, an electronic bracelet, an electronic necklace, an electronic accessory, or a smart watch), a virtual reality (VR) device, an augmented reality (AR) device, a mixed reality (MR) device, and/or the like.

Referring to FIG. 1, the display device 10 may include a pixel array 100 and a driving circuit 200.

The pixel array 100 includes a plurality of pixels PX and may display an image frame-by-frame. The pixel array 100 may include a light-emitting diode (LED) display implemented with LEDs and may be implemented as a flat-panel display or a flexible display. For example, the pixel array 100 may include an LED display implemented with LEDs each having a size of 100 micrometers (m) or less. However, the disclosure is not limited thereto, and the pixel array 100 may be implemented as a different type of a display, such as, for example but not limited to, a liquid crystal display (LCD), an organic LED (OLED), an active-matrix OLED (AMOLED), an electrochromic display (ECD), a digital mirror device (DMD), and an actuated mirror device (AMD).

The plurality of pixels PX may be arranged in various patterns such as, for example but not limited to, a matrix pattern or a zigzag pattern. For example, the plurality of pixels PX may be arranged in an m×k matrix (m is an integer greater than or equal to 2, and k is an integer greater than or equal to 2). The pixel array 100 may further include a plurality of row lines RL (or scan lines) extending in a row-wise direction and a plurality of data lines DL extending in a column-wise direction, wherein the pixels PX may be connected to the plurality of data lines DL and the plurality of row lines RL.

A pixel PX may output (or emit) an optical signal. For example, the optical signal may include one of a red optical signal, a blue optical signal, and a green optical signal. A red pixel that outputs a red light signal, a blue pixel that outputs a blue light signal, and a green pixel that outputs a green light signal may be repeatedly arranged, and a red pixel, a blue pixel, and a green pixel may constitute one unit pixel. However, the disclosure is not limited thereto, and the pixel PX may output light signals of colors other than red, blue, and green. A unit pixel may be implemented by a plurality of pixels of different colors.

The pixel PX may include an emission device (e.g., ED of FIG. 5) and, for example, the emission device may include a self-emission device. For example, the emission device may include a light-emitting diode (LED). The emission device may include an LED having a micro-size to a nanoscale size. The emission device may emit light of a single peak wavelength or may emit light of a plurality of peak wavelengths.

The pixel PX may control a luminance of the emission device based on received pixel data (e.g., pulse width modulation (PWM) data). For example, the pixel PX may control the luminance of the emission device according to a PWM driving method in which a period (e.g., duty ratio) during which a driving current flows in the emission device in one cycle is varied based on pixel data. In the PWM driving method, a pulse width of a control signal (or a PWM signal) (e.g., corresponding to a length of a period during which the emission device emits light) may be proportional to the luminance. However, the disclosure is not limited thereto, and the pixel PX may further use a method of changing an intensity of the driving current flowing in the emission device according to pulse amplitude modulation (PAM).

Here, the pixel data may include a plurality of bits, and a value of the pixel data may represent a gradation corresponding to a combination of bit values. For example, when the pixel data includes N bits, the value of the pixel data (e.g., a combination of bit values of the N bits) may represent one of $2^N$ gradations. The luminance of the emission device may correspond to a gradation indicated by the value of pixel data.

The pixel PX according to an example embodiment may control the luminance of the emission device based on the PWM signal, and the emission device may emit an optical signal during a PWM ON period in which the PWM signal has an ON level (e.g., a logic high level). The PWM signal may be referred to as a luminance control signal.

The PWM signal may include a plurality of bit fields (or referred to as bit periods) respectively corresponding to a plurality of bits of pixel data, and periods (or lengths) of the plurality of bit fields may be different from one another. An ON level (e.g., a logic high level) or an OFF level (e.g., a logic low level) of each of the plurality of bit fields of the PWM signal may correspond to a bit value (e.g., '0' or '1') of a corresponding bit of pixel data. Lengths (or lengths of time) of the plurality of bit fields may be different from one another, and a length of a most significant bit (MSB) field of the PWM signal corresponding to a most significant bit (MSB) of the pixel data may be the longest. The MSB field of the PWM signal may be divided into a plurality of sub-fields and distributed in other bit fields of the PWM signal. In a unit emission period (e.g., a sub-frame period) including a plurality of bit fields respectively corresponding to a plurality of bits of pixel data, the MSB field corresponding to the MSB of the pixel data may be scrambled between other bit fields of the PWM signal. The PWM driving method will be described in detail later with reference to FIGS. 2A and 2B.

According to an example embodiment, the pixel PX may include a pixel circuit (e.g., 110 in FIG. 5) configured to control an emission time and a non-emission time of the emission device, and the pixel circuit may include a storage device configured to store the MSB of input pixel data from among a plurality of bits of the input pixel data and a serial shift circuit configured to store remaining bits, e.g., a next MSB to a least significant bit (LSB) of the input pixel data, and sequentially output the remaining bits.

The pixel circuit may generate a PWM signal including a plurality of bit fields by outputting a plurality of bits stored in the storage device and the serial shift circuit in response to one or more PWM clock signals. The serial shift circuit may sequentially output bits other than the MSB. The remaining bits may be sequentially output in an order from the next MSB to the least significant bit (LSB) or in an order from the LSB bit to the next MSB. The storage device may output the MSB during a period between at least two remaining bits being sequentially output. Therefore, a PWM signal may be generated according to the PWM driving method according to an example embodiment.

According to the PWM driving method according to an example embodiment, the MSB field having the longest period from among a plurality of bit fields may be divided into a plurality of sub-fields and arranged between other bit fields of the PWM signal, thereby preventing emission periods of two frames from being separated from or connected to each other for a long period of time under a particular condition. Therefore, a false contour effect, in which the luminance of the emission device is perceived as higher or lower than intended luminance due to the emission periods of two frames being separated from or connected to each other for a long period of time, and thus, deterioration of image quality due to the false contour effect may be prevented.

The driving circuit 200 may drive and control the pixel array 100. The driving circuit 200 may include a row driver 210, a data driver 220, and a control circuit 230.

The control circuit 230 may receive image data and external control signals (e.g., a horizontal synchronization signal, a vertical synchronization signal, and an external clock signal) from an external source, e.g., a host processor and generate, based on received external control signals, a first control signal CTRL1 and a second control signal CTRL2 for respectively controlling the row driver 210 and the data driver 220. For example, the first control signal CTRL1 and the second control signal CTRL2 may each include one or more timing control signals that control operation timings of the row driver 210 and the data driver 220, respectively. Also, the control circuit 230 may transmit one frame of received image data to the data driver 220 row-by-row. According to an example embodiment, the control logic 230 may perform image processing on the image data and transmit image-processed image data to the data driver 220.

The row driver 210 may generate a plurality of row clock signals and a plurality of row control signals for driving the plurality of pixels PX row-by-row and provide the plurality of row clock signals and the plurality of row control signals to the plurality of pixels PX through the plurality of row lines RL. The plurality of row clock signals may include first to m-th row clock signals CLK_R1 to CLK_Rm, and the plurality of row control signals may include first to m-th row control signals CS_R1 to CS_Rm.

According to an example embodiment, the row driver 210 may generate the first to m-th row clock signals CLK_R1 to CLK_Rm by delaying reference clock signals by one horizontal period and generate the plurality of first to m-th row control signals CS_R1 to CS_Rm by delaying reference control signals by one horizontal period. For example, second low clock signal CLK_R2 may have a form such that the first row clock signal CLK_R1 is delayed by one horizontal period, and a third row clock signal CLK_R3 may have a form such that the second low clock signal CLK_R2 is delayed by one horizontal period. Here, horizontal periods may be distinguished from each other by a horizontal synchronization signal.

A row of pixels PX arranged in the same row may be connected to the same row line RL, receive the same row clock signal and the same row control signal, store pixel data received based on received row clock signal and received row control signal, and output optical signals based on a PWM signal corresponding to the pixel data.

The row driver 210 may include a clock generator 20, and the clock generator 20 may generate a data clock signal and a PWM clock signal based on a source clock signal. One frame period may include a write period and an emission period, wherein the data clock signal may be used by a pixel PX to store received pixel data during the write period, and the PWM clock signal may be used by the pixel PX to generate a PWM signal based on the pixel data during the emission period. A data clock signal and a PWM clock signal may optionally be provided to the pixel PX as row clock signals.

The data driver 210 may output received image data row-by-row, e.g., pixel data of one row, through the plurality of data lines DL. For example, the plurality of data lines DL may include first to k-th data lines, and first to k-th pixel data D1 to Dk may be output simultaneously through the first to k-th data lines. At this time, the plurality of bits of the pixel data may be output serially through one data line DL. The plurality of bits of the pixel data may be output sequentially in the order from the MSB to the LSB or the order from the LSB to the MSB.

From among the pixels PX of one column connected to a data line DL, one pixel PX corresponding to a write period may store pixel data received through the data line DL. For example, during the write period of pixels PX of a second row, a pixel PX disposed in the second row from among pixels PX of a first column may store pixel data received through a first data line DL. As described above, the plurality of pixels PX may operate row-by-row. Therefore, the pixels PX arranged in the second row may each store pixel data received through a corresponding data line DL. As described above, the MSB may be stored in a storage device, and the next MSB to the LSB may be stored in a serial shift circuit.

The plurality of pixels PX may generate a PWM signal based on pixel data received from the data driver 220 and row clock signals and row control signals received from the row driver 210, thereby controlling the luminance of the emission device.

The components of the driving circuit 200, e.g., the row driver 210, the data driver 220, and the control logic 230, may each be provided in a form of a separate integrated circuit chip or may be provided in a form of a single integrated circuit chip and may be mounted on a substrate of the pixel array 100, may be mounted on a flexible printed circuit film and attached to the substrate in a form of a tape carrier package (TCP), or may be directly provided on the substrate.

Figure 2A:
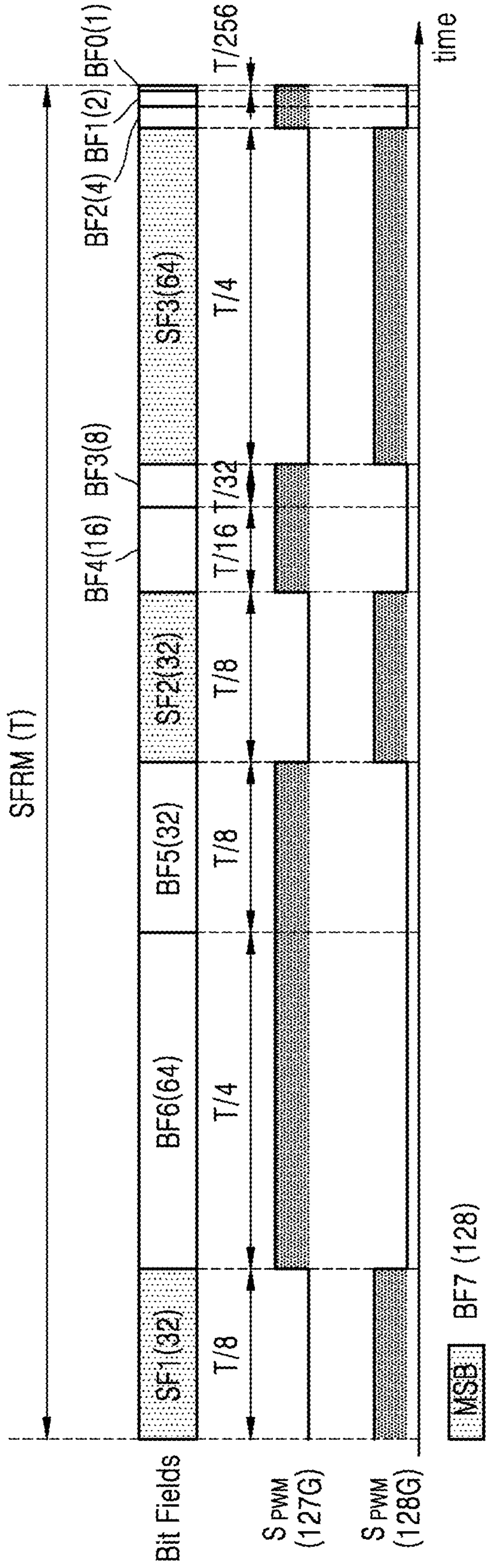
FIGS. 2A and 2B are diagrams showing a pulse width modulation (PWM) driving method according to an example embodiment.
Figure 2B:
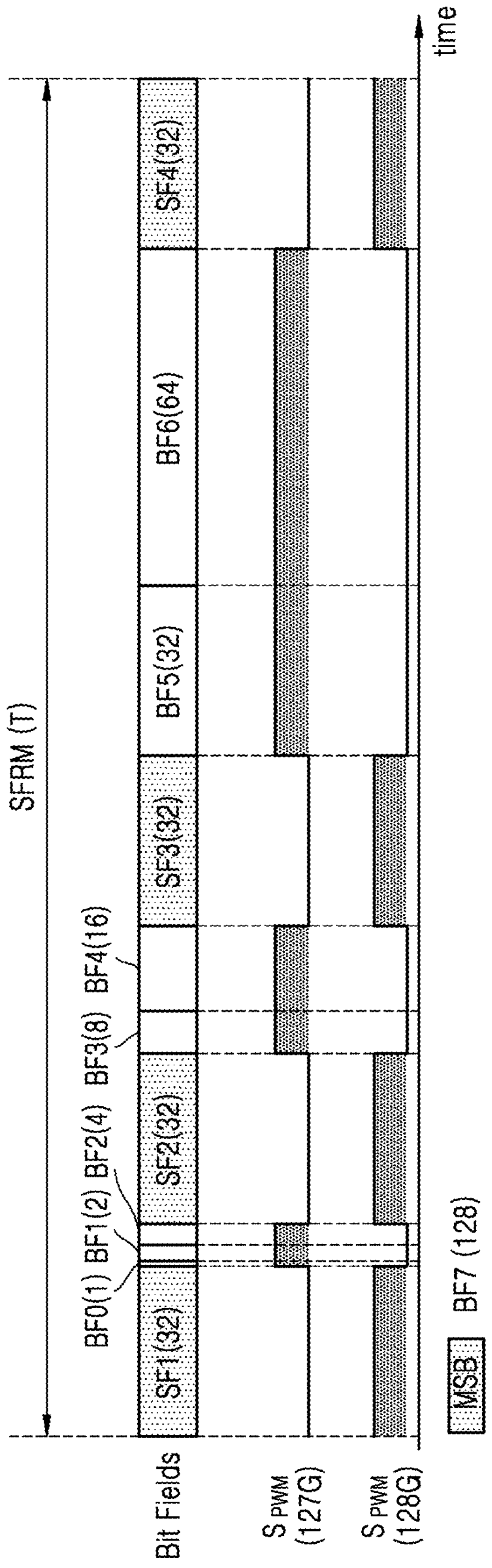

FIGS. 2A and 2B are diagrams showing a PWM driving method according to an example embodiment.

In FIGS. 2A and 2B, a PWM signal $S_{PWM}$ may represent gradation according to pixel data. When the pixel data includes 8 bits, the PWM signal $S_{PWM}$ may represent 256 gradations from gradation 0 to gradation 255. The case in which the PWM signal $S_{PWM}$ represents gradation 127 (also referred to as 127G) and the case in which the PWM signal $S_{PWM}$ represents gradation 128 (also referred to as 128G) will be described as examples.

One frame (or referred to as a frame period) in which an image is displayed on a display device (e.g., 10 of FIG. 1) may include one or more sub-frames (or referred to as one or more sub-frame periods). A sub-frame may be referred to as a unit emission period (or unit PWM period). The PWM signal $S_{PWM}$ may control luminance of an emission device on a sub-frame SFRM basis. The PWM signal may be identical in a plurality of sub-frames provided in one frame.

Referring to FIG. 2A, the PWM signal $S_{PWM}$ in the sub-frame SFRM may include 8 bit fields (e.g., 0th to seventh bit fields BF0 to BF7) corresponding to 8 bits of pixel data, e.g., 0th to seventh bits. Here, a seventh bit of the pixel data may be the MSB of the pixel data, and a seventh bit field BF7 of the PWM signal may correspond to the MSB of the PWM signal. A 0th bit of the pixel data may be the LSB of the pixel data, and a 0th bit field BF0 of the PWM signal may correspond to the LSB of the PWM signal.

In the 0th to seventh bit fields BF0 to BF7, the bit value ('0' or '1') of a corresponding bit of each bit field may be generated as the PWM signal $S_{PWM}$ of a corresponding bit field. For example, when a bit value of a bit field is '0', the corresponding bit field of the PWM signal $S_{PWM}$ may be at an OFF level (e.g., a logic low level), and, when a bit value of a bit field is '1', the corresponding bit field of the PWM signal $S_{PWM}$ may be at an ON level (e.g., a logic high level).

From among the 0th to seventh bit fields BF0 to BF7, a length of the seventh bit field BF7 may be the longest, and a length of the 0th bit field BF0 corresponding to the MSB is the shortest. A length of an N-th bit field corresponding to an N-th bit (N is an integer greater than or equal to 1) may be twice a length of an (N−1)-th bit field corresponding to an (N−1)-th bit. For example, the length of a third bit field BF3 is twice a length of a second bit field BF2.

A length of each of a plurality of bit fields, e.g., a length of the 0th to seventh bit fields BF0 to BF7, may be determined by a length of the sub-frame SFRM. For example, when a length of the sub-frame SFRM is T, the length of the seventh bit field BF7 may be $T/2^{(8-7)}$ (=T/2), and the length of a sixth bit field BF6 may be $T/2^{(8-6)}$ (=T/4). The length of the 0th bit field BF0 may be $T/2^{(8-0)}$ (=T/256).

Referring to FIG. 2A, the seventh bit field BF7 may be divided into a plurality of sub-fields, e.g., first to third sub-fields SF1, SF2, and SF3, and the first to third sub-fields SF1, SF2, and SF3 may be distributed across an entire period of the sub-frame SFRM. The length of each of a first sub-field SF1 and a second sub-field SF2 may be T/8, and the length of a third sub-field SF3 may be T/4.

Numbers respectively written in parentheses for the 0th to seventh bit fields BF0 to BF7 and the first to third sub-fields SF1, SF2, and SF3 indicate relative lengths of respective fields. When a length of the 0th bit field BF0 is denoted as 1, lengths (or periods) of the first to seventh bit fields BF1 to BF7 may be denoted as 2, 4, 8, 16, 32, 64, and 128, respectively. Lengths of the first to third sub-fields SF1, SF2, and SF3 may be denoted as 32, 32, and 64, respectively.

When a plurality of bits of pixel data are output as the PWM signal $S_{PWM}$, bits other than the MSB from among the plurality of bits may be output in the order from the next MSB to the LSB. Therefore, the sixth bit field BF6 to the 0th bit field BF0 may be located in the PWM signal $S_{PWM}$ in the order stated. At least one sub-field from among the first to third sub-fields SF1, SF2, and SF3 may be distributed among 0th to sixth bit fields BF0 to BF6.

According to an example embodiment, the first sub-field SF1 may be placed at a very beginning of a plurality of bit fields, e.g., at a beginning of the sub-frame SFRM. According to an example embodiment, the sixth bit field BF6 and a fifth bit field BF5 may be consecutive, and the second sub-field SF2 may be located between the fifth bit field BF5 and a fourth bit field BF4. The third sub-field SF3 may be placed between the third bit field BF3 and the second bit field BF2.

When a gradation 127 127G is expressed as binary data, the gradation 127 127G may be expressed as '01111111'. Therefore, the PWM signal corresponding to the gradation 127 127G may be at an OFF level in three sub-fields, that is, the first to third sub-fields SF1, SF2, and SF3, of the seventh bit field BF7 and may be at an ON level in sixth to 0th bit fields BF6 to BF0. As the three sub-fields, that is, the first to third sub-fields SF1, SF2, and SF3, are distributed among 0th to 6th bit fields BF0 to BF6, periods of an OFF level of the PWM signal in the sub-frame SFRM (hereinafter referred to as OFF level periods) may be distributed (or repeated).

When a gradation 128 128G is expressed as binary data, the gradation 128 128G may be expressed as '10000000'. The PWM signal corresponding to the gradation 128 128G may be at an ON level in three sub-fields, that is, the first to third sub-fields SF1, SF2, and SF3, of the seventh bit field BF7 and may be at an OFF level in the sixth to 0th bit fields BF6 to BF0. As the three sub-fields, that is, the first to third sub-fields SF1, SF2, and SF3, are distributed among 0th to 6th bit fields BF0 to BF6, periods of an ON level of the PWM signal $S_{PWM}$ in the sub-frame SFRM (hereinafter referred to as ON level periods) may be distributed. Therefore, the OFF level period and the ON level period of the PWM signal $S_{PWM}$ may be repeated in the period of sub-frame SFRM.

Referring to FIG. 2B, the seventh bit field BF7 may be divided into a plurality of sub-fields, e.g., first to fourth sub-fields SF1 to SF4, and the first to fourth sub-fields SF1 to SF4 may be distributed over the entire period of the sub-frame SFRM. When a plurality of bits of pixel data are output as the PWM signal $S_{PWM}$, bits other than the MSB from among the plurality of bits of the pixel data may be output in the order from the LSB to the next MSB. Therefore, the 0th bit field BF0 to the sixth bit field BF6 may be located in the PWM signal $S_{PWM}$ in the order stated. At least two sub-fields from among the first to fourth sub-fields SF1 to SF4 may be distributed among the 0th to sixth bit fields BF0 to BF6.

According to an example embodiment, the first sub-field SF1 may be placed at a very beginning of a plurality of bit fields, e.g., at a beginning of the sub-frame SFRM. From among the 0th to sixth bit fields BF0 to BF6, two bit fields may be arranged consecutively. The second sub-field SF2 may be disposed between the second bit field BF2 and the third bit field BF3, and the third sub-field SF3 may be disposed between the fourth bit field BF4 and the fifth bit field BF5. The fourth sub-field SF4 may be placed at a very end of a plurality of bit fields, e.g., at an end of the sub-frame SFRM.

As four sub-fields, that is, the first to fourth sub-fields SF1 to SF4 of the seventh bit field BF7 may be distributed in the sub-frame SFRM, as described above with reference to FIG. 2B, in a case in which the PWM signal $S_{PWM}$ represents the gradation 127 127G or the gradation 128 128G, ON level periods of the PWM signal $S_{PWM}$ corresponding to the gradation 127 127G and ON level periods of the PWM signal $S_{PWM}$ corresponding to the gradation 128 128G may be distributed in the sub-frame SFRM. The OFF level period and the ON level period of the PWM signal $S_{PWM}$ may be repeated in the sub-frame SFRM.

Figure 3A:
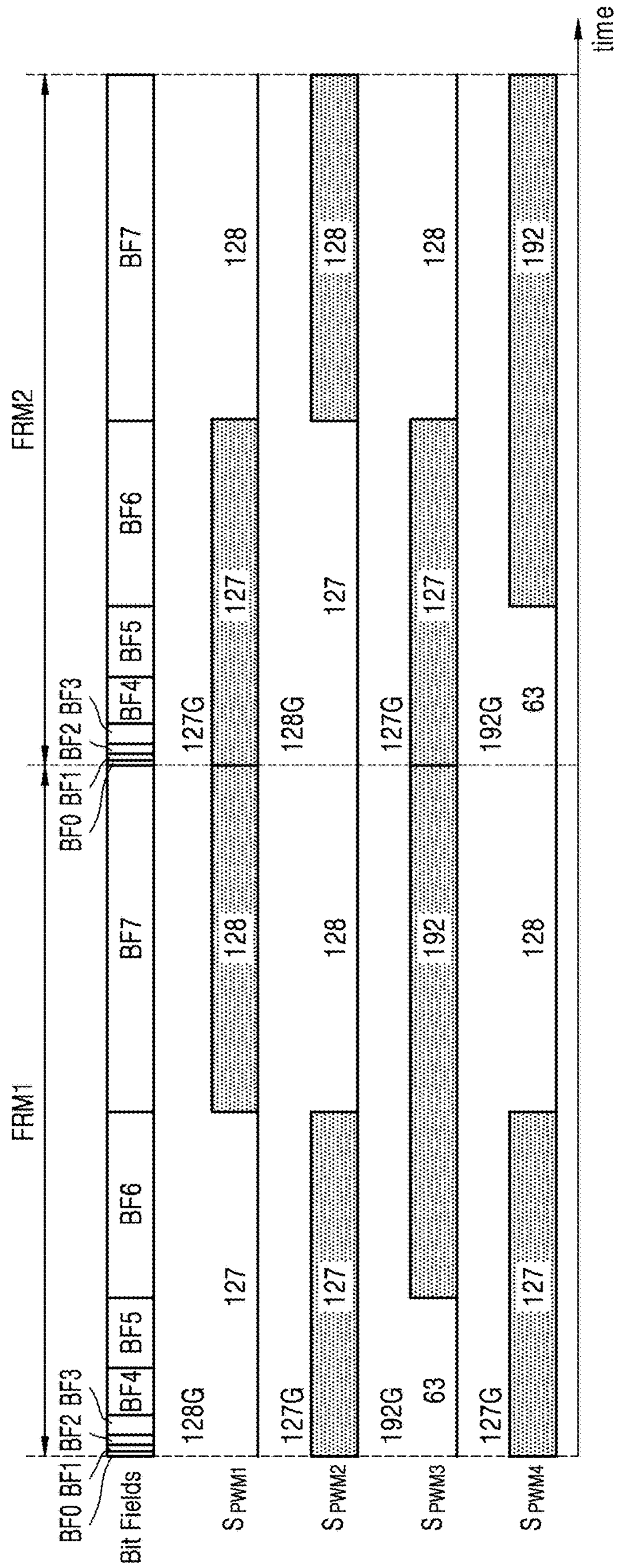
FIGS. 3A and 3B are diagrams showing a PWM driving method according to a comparative example and according to an example embodiment.
Figure 3B:
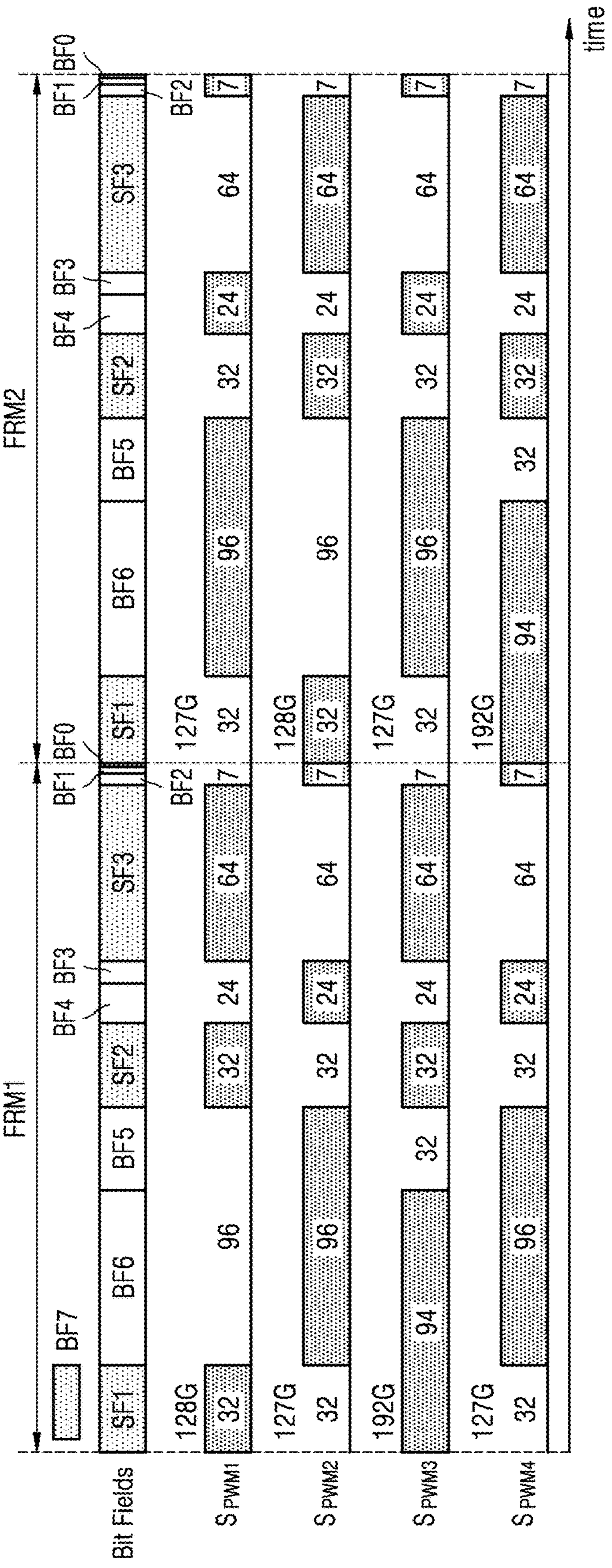

FIG. 3A is a waveform diagram of a PWM signal including two frames and generated according to a PWM driving method according to a comparative example, and FIG. 3B is a waveform diagram of a PWM signal including two frames and generated according to a PWM driving method according to an example embodiment.

According to the PWM driving method according to the comparative example, the 0th to seventh bit fields BF0 to BF7 may be located sequentially in a unit emission period.

Each of a first frame FRM1 and a second frame FRM2 may include one sub-frame, and the 0th to seventh bit fields BF0 to BF7 may be located sequentially in each of the first frame FRM1 and the second frame FRM2. For example, from each frame, the LSB to the MSB of pixel data may be sequentially output as the PWM signal $S_{PWM}$.

When it is assumed that the length of the 0th bit field BF0 is 1, the lengths of first to seventh bit fields BF1 to BF7 are 2, 4, 8, 16, 32, 64, and 128, respectively. A number denoted in each period of a first PWM signal $S_{PWM1}$ to a fourth PWM signal $S_{PWM4}$ indicates a relative length of each period, and a total length of periods of each PWM signal (or each frame) is 255.

The first PWM signal $S_{PWM1}$ represents the gradation 128 128G in the first frame FRM1 and the gradation 127 127G in the second frame FRM2. When the gradation 127 127G is expressed as binary data, the gradation 127 127G may be expressed as '01111111', and, when the gradation 128 128G is expressed as binary data, the gradation 128 128G may be expressed as '10000000'. A first PWM signal $S_{PWM1}$ may be at an ON level in the seventh bit field BF7 of the first frame FRM1 and may be at an ON level in the 0th to sixth bit fields BF0 to BF6 of the second frame FRM2. The first PWM signal $S_{PWM1}$ may be at an ON level for a total of a length 255 of periods, including a last portion of a length of 128 of the first frame FRM1 and a first portion of a length of 127 of the second frame FRM2.

A second PWM signal $S_{PWM2}$ represents the gradation 127 127G in the first frame FRM1 and the gradation 128 128G in the second frame FRM2. The second PWM signal $S_{PWM2}$ may be at an ON level in the 0th to sixth bit fields BF0 to BF6 of the first frame FRM1 and may be at an ON level in the seventh bit field BF7 of the second frame FRM2. Therefore, the second PWM signal $S_{PWM2}$ may be at an OFF level for a total of a length 255 of periods, including a last portion of a length of 128 of the first frame FRM1 and a first portion of a length of 127 of the second frame FRM2.

A third PWM signal $S_{PWM3}$ represents a gradation 192 192G in the first frame FRM1 and the gradation 127 127G in the second frame FRM2. When the gradation 192 192G is expressed as binary data, the gradation 192 192G may be expressed as '11000000'. The third PWM signal $S_{PWM3}$ may be at an ON level in the sixth bit field BF6 and the seventh bit field BF7 of the first frame FRM1 and may be at an ON level in the 0th to sixth bit fields BF0 to BF6 of the second frame FRM2. Therefore, the third PWM signal $S_{PWM3}$ may be at an ON level for a total of a length 319 of periods, including a last portion of a length of 192 of the first frame FRM1 and a first portion of a length of 127 of the second frame FRM2.

The fourth PWM signal $S_{PWM4}$ represents the gradation 127 127G in the first frame FRM1 and the gradation 192 192G in the second frame FRM2. The fourth PWM signal $S_{PWM4}$ may be at an ON level in the 0th to sixth bit fields BF0 to BF6 of the first frame FRM1 and may be at an ON level in the bit field BF6 and the seventh bit field BF7 of the second frame FRM2. Therefore, the fourth PWM signal $S_{PWM4}$ may be at an OFF level for a total of a length 191 of periods, including a last portion of a length of 128 of the first frame FRM1 and a first portion of a length of 63 of the second frame FRM2.

As described above, according to the PWM driving method according to the comparative example, the ON level periods of the PWM signal may be concentrated in the first half or the second half of each frame at a particular gradation. Therefore, under the condition that particular gradations are set for two frames, the periods of ON levels of a PWM signal within the two frames may be separated from or consecutive to one another for a long period of time.

FIG. 3B is a diagram showing PWM signals according to a PWM driving method according to an example embodiment when gradations are set for the first frame FRM1 and the second frame FRM2 in the same manner as in FIG. 3A.

Same as the first PWM signal $S_{PWM1}$ of FIG. 3A, the first PWM signal $S_{PWM1}$ may be at an ON level in the seventh bit field BF7 of the first frame FRM1 and may be at an ON level in the first to sixth bit fields BF1 to BF6 of the second frame FRM2. However, according to the PWM driving method of the disclosure, since the first to third sub-fields SF1, SF2, and SF3 of the seventh bit field BF7 are distributed within frames, ON level periods and OFF level periods of the first PWM signal $S_{PWM1}$ may be repeated within the first frame FRM1 and the second frame FRM2. ON level periods and OFF level periods of the second PWM signal $S_{PWM2}$, the third PWM signal $S_{PWM3}$, and the fourth PWM signal $S_{PWM4}$ may also be repeated within the first frame FRM1 and the second frame FRM2.

In FIG. 3B, ON level periods and OFF level periods of the first PWM signal $S_{PWM1}$, the second PWM signal $S_{PWM2}$, the third PWM signal $S_{PWM3}$, and the fourth PWM signal $S_{PWM4}$ may be relatively distributed within the first frame FRM1 and the second frame FRM2 without being concentrated to particular time within the first frame FRM1 and the second frame FRM2, as shown in FIG. 3A.

Figure 4A:
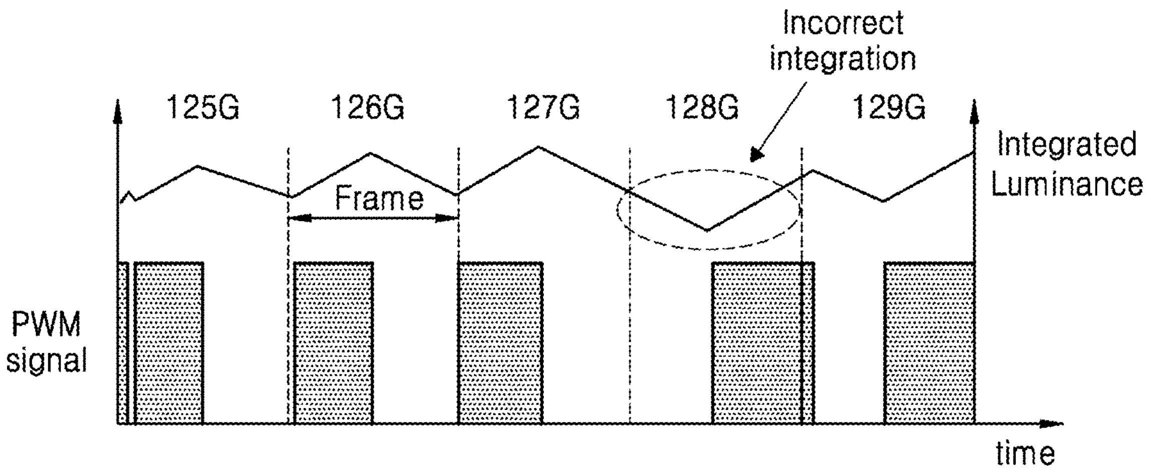
FIGS. 4A and 4B are graphs showing a false contour effect.
Figure 4B:
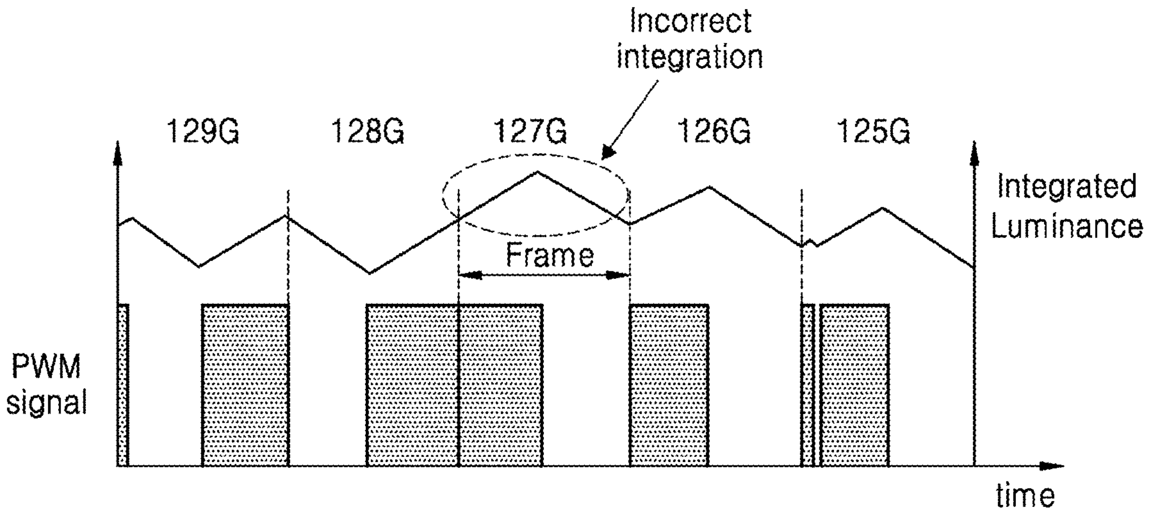

FIGS. 4A and 4B are graphs showing the false contour effect.

In the graphs of FIGS. 4A and 4B, a horizontal axis represents time, and a vertical axis represents a waveform and integrated luminance of a PWM signal in a plurality of frames.

It is assumed that one frame period includes one sub-frame period. A gradation is set for each frame period in a plurality of frame periods, and FIGS. 4A and 4B shows a waveform of a PWM signal according to the PWM driving method of the comparative example of FIG. 3 according to gradations set for respective frame periods. An emission device emits an optical signal during the ON level period of the PWM signal. A human eye perceives luminance by integrating a received optical signal with respect to time, and integrated luminance represents the luminance perceived by the human eye.

Referring to FIG. 4A, a gradation 125 125G, a gradation 126 126G, the gradation 127 127G, the gradation 128 128G, and a gradation 129 129G may be set for a plurality of frame periods. Within two frame periods for which the gradation 127 127G and the gradation 128 128G are respectively set, the false contour effect may occur such that luminance is recognized to be lower than intended luminance as ON level periods of the PWM signal (e.g., the period in which the emission device emits an optical signal) are separated from each other for a long period of time. When the gradation changes step-by-step from the gradation 125 125G to the gradation 129 129G, perceived luminance needs to increase step-by-step. However, when the gradation is switched from the gradation 127 127G to the gradation 128 128G, the perceived luminance decreases, and thus the image quality may be deteriorated.

Referring to FIG. 4B, the gradation 129 129G, the gradation 128 128G, the gradation 127 127G, the gradation 126 126G, and the gradation 125 125G may be set for a plurality of frame periods. Within two frame periods for which the gradation 128 128G and the gradation 127 127G are respectively set, the false contour effect may occur such that luminance is recognized to be higher than intended luminance as ON level periods of the PWM signal (e.g., the period in which the emission device emits an optical signal) continues for a long period of time.

When the gradation changes step-by-step from the gradation 129 129G to the gradation 125 125G, perceived luminance needs to decrease step-by-step. However, when the gradation is switched from the gradation 128 128G to the gradation 127 127G, the perceived luminance increases, and thus the image quality may be deteriorated.

According to the PWM driving method according to an example embodiment, as described above, the ON level periods of the PWM signal may be distributed in a frame period or a sub-frame period even at a particular gradation such as the gradation 127 127G or the gradation 128 128G. Therefore, the false contour effect and the resulting deterioration of image quality may be prevented.

Figure 5:
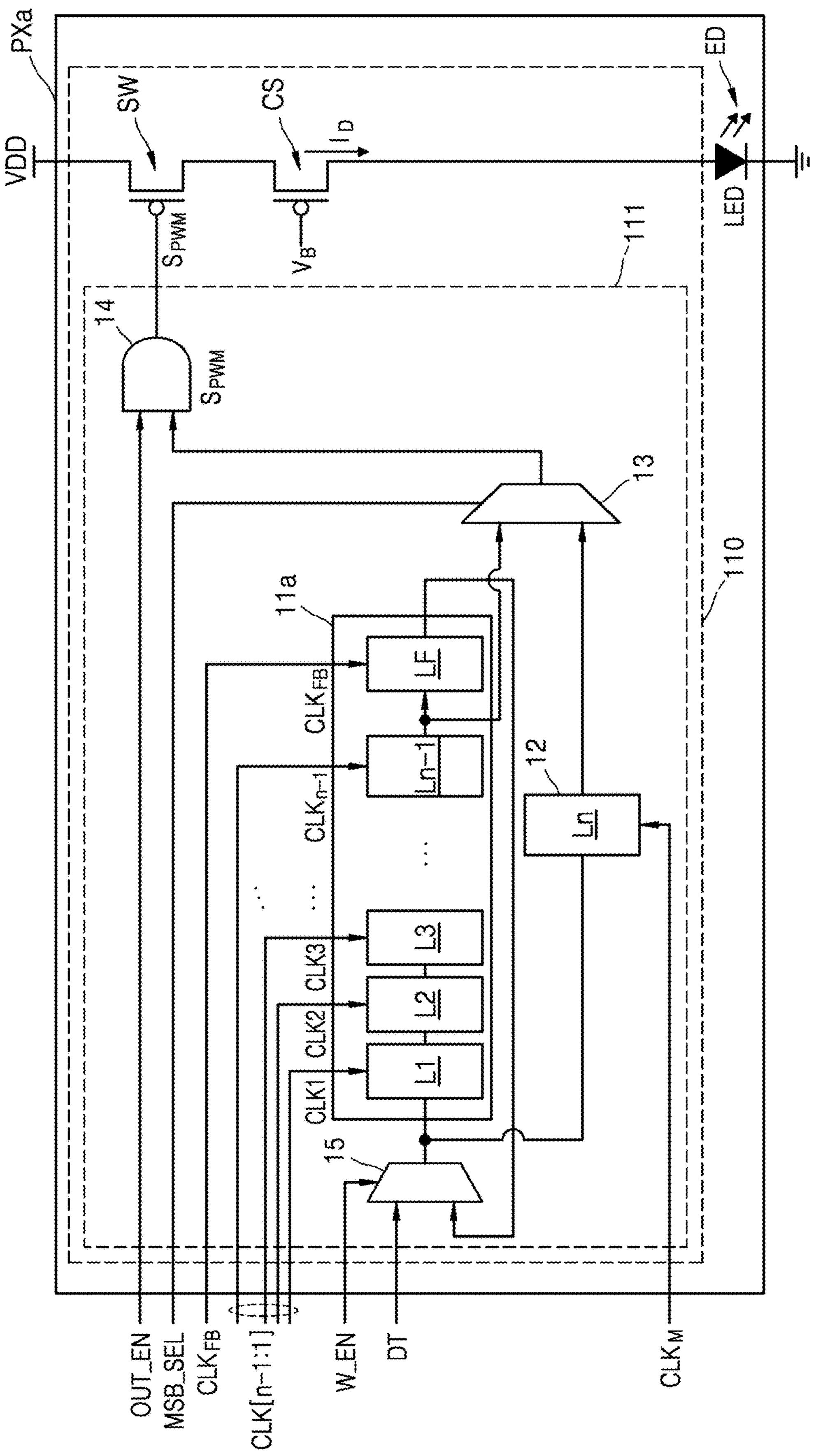
FIG. 5 is a diagram showing a pixel according to an example embodiment.

FIG. 5 is a diagram showing a pixel according to an example embodiment.

A pixel PXa may be applied to the pixel PX of the display device 10 of FIG. 1 and may generate the PWM signal $S_{PWM}$ according to the above-described PWM driving method.

Referring to FIG. 5, the pixel PXa may include a pixel circuit 110 and an emission device ED. According to an example embodiment, the emission device ED may be an LED.

The pixel circuit 110 may include a PWM circuit 111, a switch SW, and a current source CS. The pixel circuit 110 may be implemented with thin-film transistors.

Each of the switch SW and the current source CS may be implemented with one or more transistors, e.g., a metal-oxide semiconductor field effect transistor (MOSFET). The switch SW may be turned on or off in response to the PWM signal $S_{PWM}$. The current source CS may generate a driving current $I_D$ based on a bias voltage $V_B$.

The switch SW, the current source CS, and the emission device ED may be connected in series. A first power voltage VDD (e.g., a high level power voltage) may be applied to a first terminal of the switch SW, and a second terminal of the switch SW may be connected to a first terminal of the current source CS. A second terminal of the current source CS may be connected to a first terminal of the emission device ED. A second terminal of the emission device ED may be grounded or a second power voltage (e.g., a low level power voltage) may be applied to the second terminal of the emission device ED. When the switch SW is turned on in response to the ON level of the PWM signal $S_{PWM}$, the current source CS may generate the driving current $I_D$ and provide the driving current $I_D$ to the emission device ED, and the emission device ED may emit light based on the driving current $I_D$. When the switch SW is turned off in response to the OFF level of the PWM signal $S_{PWM}$, the generation of the driving current $I_D$ is blocked, and thus the emission device ED may not emit light.

The PWM circuit 111 may generate the PWM signal $S_{PWM}$ based on received pixel data DT, control signals, and clock signals.

The PWM circuit 111 may include a serial shift circuit 11*a*, a storage device 12, an output selection circuit 13, an output control logic 14, and an input selection circuit 15.

The serial shift circuit 11*a* may sequentially store and output n−1 bits other than an MSB from among n bits of the pixel data DT received from the data driver 220 of FIG. 1 through the data line DL. The serial shift circuit 11*a* may include a plurality of storage devices, e.g., first to (n−1)-th latches L1 to Ln−1. For example, when the pixel data DT includes 8 bits of data, the serial shift circuit 1*a* may include 7 latches. A next MSB to an LSB bit of the pixel data DT may be stored in the first to (n−1)-th latches L1 to Ln−1.

The serial shift circuit 11*a* may sequentially store and output n−1 bits excluding the MSB of the pixel data DT according to an order in which n bits of the pixel data DT are received. For example, when the pixel data DT is received in order from the MSB to the LSB, at an end of a write period, the next MSB of the pixel data DT may be stored in an (n−1)-th latch n−1 and the LSB of the pixel data DT may be stored in a first latch L1. For example, when the pixel data DT is received in an order from the LSB to the MSB, at the end of the write period, the LSB of the pixel data DT may be stored in the (n−1)-th latch n−1 and the next MSB of the pixel data DT may be stored in the first latch L1.

The first to (n−1)-th latches L1 to Ln−1 may each store a bit received in response to a corresponding clock signal from among first to (n−1)-th clock signal CLK1 to CLKn−1 (CLK[n−1:1]) and output a stored bit to a next latch or the output selection circuit 13 connected to an output terminal of a corresponding latch. For example, the first latch L1 may store a bit received from the input selection circuit 15 in response to a first clock signal CLK1 and output a stored bit to a second latch L2. The second latch L2 may store a bit received from the first latch L1 in response to a second clock signal CLK2 and output a stored bit to a third latch L3. An (n−1)-th latch Ln−1 may output a bit received from a previous latch (e.g., an (n−2)-th latch) to the output selection circuit 13 in response to an (n−1)-th clock signal CLKn−1. A bit output from the (n−1)-th latch Ln−1 during an emission period may be provided to the switch SW as the PWM signal $S_{PWM}$ in a corresponding bit field.

The first to (n−1)-th clock signals CLK1 to CLKn−1 may include a write clock signal in a write period and a PWM clock signal in a sub-frame period. In some embodiments, first to (n−2)-th clock signals CLK1 to CLKn−2 may have a waveform corresponding to a delayed waveform of the (n−1)-th clock signal CLKn−1. The first to (n−1)-th clock signals CLK1 to CLKn−1 will be described later with reference to FIG. 6.

The serial shift circuit 11*a* may further include a feedback latch LF. The feedback latch LF may be an extra latch for feeding back bits stored in n−1 latches L1 to Ln−1. Therefore, the feedback latch LF may be connected to the (n−1)-th latch Ln−1. The feedback latch LF may store a bit received from the (n−1)-th latch Ln−1 in response to a feedback clock signal $CLK_{FB}$ and output a stored bit to the input selection circuit 15.

The storage device 12 may store and output the MSB of the pixel data DT from among n bits of the pixel data DT. In example embodiments, the storage device 12 may be implemented as a latch. The storage device 12 may store the MSB of the pixel data DT received from the input selection circuit 15 in response to an MSB clock signal $CLK_M$ and output the stored MSB to the output selection circuit 13. A bit output from the storage device 12 during the emission period may be provided to the switch SW as the PWM signal $S_{PWM}$ in a plurality of sub-fields of the MSB field.

The output selection circuit 13 may selectively output a bit output from the (n−1)-th latch Ln−1 of the serial shift circuit 11*a* and the MSB output from the storage device 12 as the PWM signal $S_{PWM}$. According to an example embodiment, output selection circuit 13 may be implemented as a multiplexer.

In response to an MSB selection signal MSB_SEL, the output selection circuit 13 may output the MSB of the pixel data DT as the PWM signal $S_{PWM}$ in a plurality of sub-fields corresponding to the MSB and output bits provided from the (n−1)-th latch Ln−1 in corresponding bit field periods respectively corresponding to the next MSB to the LSB as the PWM signal $S_{PWM}$. Therefore, the MSB field may be distributed in the signal $S_{PWM}$.

The output control logic 14 may or may not output the PWM signal $S_{PWM}$ based on an output enable signal OUT_EN. For example, the output control logic 14 may be implemented with an AND gate, output the PWM signal $S_{PWM}$ when the output enable signal OUT_EN is at a first level (e.g., a logic high level), and block the PWM signal $S_{PWM}$ from being output when the output enable signal OUT_EN is at a second level (e.g., a logic low level). In an embodiment, the PWM signal $S_{PWM}$ may be at an OFF level, when the output enable signal OUT_EN is at the second level. According to an example embodiment, the output control logic 14 may block the PWM signal $S_{PWM}$ from being output during periods between a plurality of sub-frame periods included in one frame.

The input selection circuit 15 may output a plurality of bits of the pixel data DT received through the data line DL of FIG. 1 or output a bit (e.g., a feedback bit) received from the feedback latch LF, in response to a write enable signal W_EN. The write enable signal W_EN may be at a logic high level during a write period, and the input selection circuit 15 may output a plurality of bits of the pixel data DT in response to the write enable signal W_EN at a first level (e.g., a logic high level). The input selection circuit 15 may output a feedback bit in response to a write enable signal W_EN at a second level (e.g., a logic low level).

Figure 6:
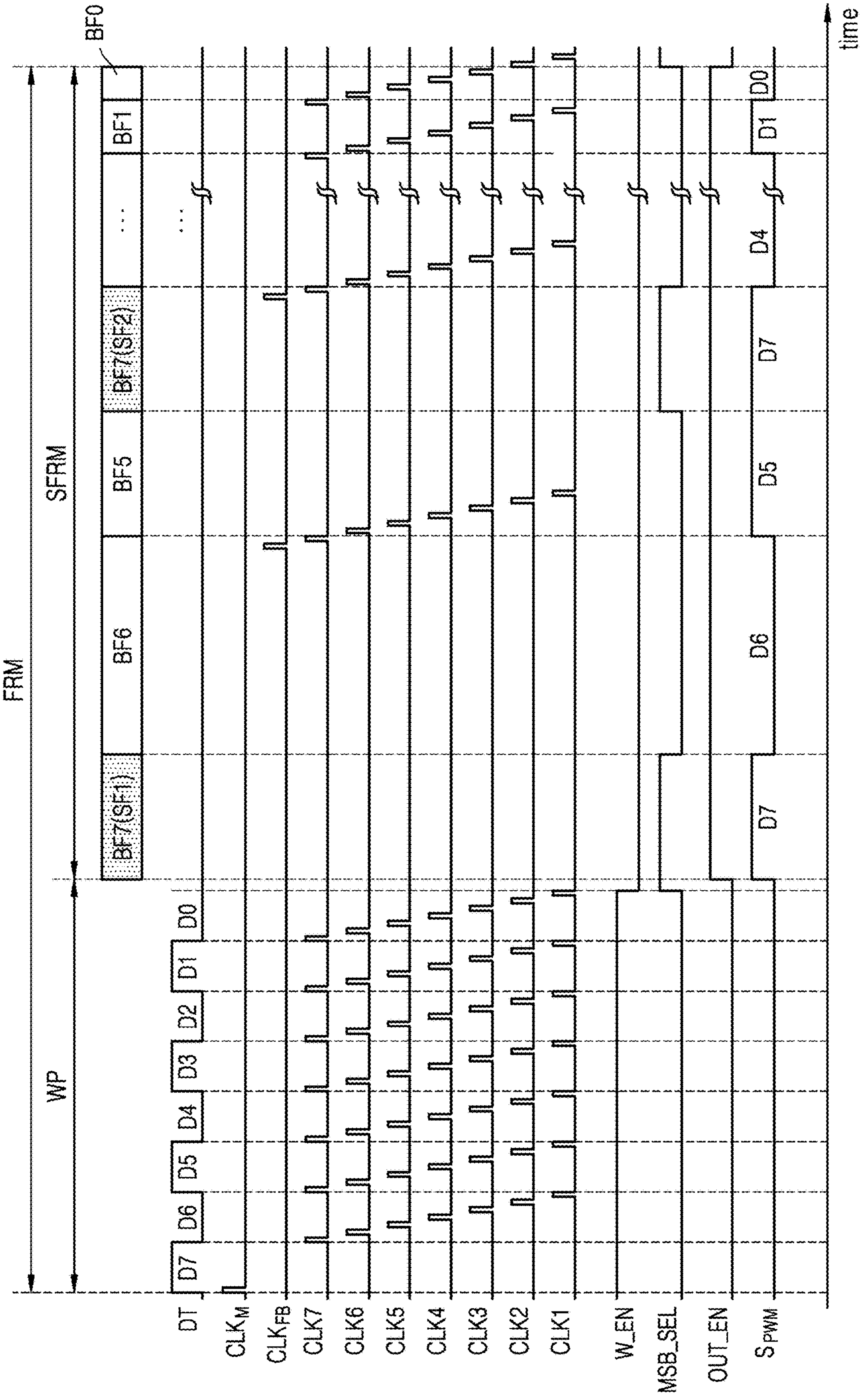
FIG. 6 is a timing diagram of a pixel according to an example embodiment.

FIG. 6 is a timing diagram of a pixel according to an example embodiment.

FIG. 6 shows control signals, clock signals, the pixel data DT, and the PWM signal $S_{PWM}$ input to the pixel PXa of FIG. 5. Descriptions of FIG. 6 will be given below with reference to FIG. 5 together. Here, the control signals may include the write enable signal W_EN, the MSB enable signal MSB_EN, and the output enable signal OUT_EN, and the clock signals may include first to seventh clock signals CLK1 to CLK7, the MSB clock signal $CLK_M$ and the feedback clock signal $CLK_{FB}$.

One frame FRM may include a write period WP and one or more sub-frames SFRM. Although FIG. 6 shows that the frame FRM includes one sub-frame SFRM, this is merely for convenience of explanation, and the frame FRM may include a plurality of sub-frames SFRM. A period including one or more sub-frames SFRM may be referred to as an emission period (also called a PWM period).

The pixel data DT may be received in the write period WP. For example, the pixel data DT may include 0th to seventh bits DO to D7, and a seventh bit D7 to a 0th bit D0 may be sequentially input to the pixel PXa in the order stated. When the pixel data DT is '10101010', the bit value of each of the seventh bit D7, a fifth bit D5, a third bit D3, and a first bit D1 is '1', whereas the bit value of each of a sixth bit D6, a fourth bit D4, a second bit D2, and the 0th bit DO is '0'.

The write enable signal W_EN may be at a second level (e.g., a logic high level), and the input selection circuit 15 may output received seventh bit D7 to the 0th bit DO in response to the write enable signal W_EN at the second level.

After the input selection circuit 15 outputs the seventh bit D7, the MSB clock signal $CLK_M$ is toggled, and the storage device 12 may output the seventh bit D7, e.g., the MSB, in response to the MSB clock signal $CLK_M$.

Thereafter, seventh to first clock signals CLK7 to CLK1 may be sequentially toggled. The serial shift circuit 11*a* may store the sixth bit D6 to the 0th bit DO in response to the seventh to first clock signals CLK7 to CLK1. At the end of the write period WP, the sixth bit D6 may be stored in the (n−1)-th latch Ln−1 (hereinafter referred to as a seventh latch, as an example), and the 0th bit DO (e.g., the least significant bit) may be stored in the first latch L1. When storage of the seventh bit D7 to the 0th bit DO is completed, the write enable signal W_EN may transition from a logic high level to a logic low level.

During the write period WP, the output enable signal OUT_EN may be at a logic low level, and the output control logic 14 may block the PWM signal $S_{PWM}$ from being output. When the sub-frame SFRM starts, the output enable signal OUT_EN may transition from a logic low level to a logic high level. The output control logic 14 may output the PWM signal $S_{PWM}$ provided from the output selection circuit 13.

The sub-frame SFRM may include the 0th to seventh bit fields BF0 to BF7, wherein the 0th to seventh bit fields BF0 to BF7 may correspond to the 0th bit DO (e.g., the least significant bit) to the seventh bit D7 (e.g., the MSB), respectively.

The seventh bit field BF7 may be divided into a plurality of sub-fields SF1 and SF2 and distributed in the sub-frame SFRM. The first sub-field SF1 of the seventh bit field BF7 may be located at a beginning of the sub-frame SFRM. Before the first sub-field SF1 starts, the MSB selection signal MSB_SEL may transition from a logic low level to a logic high level.

The output selection circuit 13 may output the seventh bit D7 provided from the storage device 12 to the first sub-field SF1, in response to the MSB selection signal MSB_SEL at a logic high level. Therefore, the seventh bit D7 may be output as the PWM signal $S_{PWM}$ to the first sub-field SF1 of the seventh bit field BF7. Since the bit value of the seventh bit D7 is '1', the PWM signal $S_{PWM}$ may be at a first level (e.g., ON level). The emission device ED may emit light.

The sixth bit field BF6 may be consecutive to the first sub-field SF1, and the MSB selection signal MSB_SEL in the sixth bit field BF6 may transition from a logic high level to a logic low level. The output selection circuit 13 may output the sixth bit D6 output from the seventh latch as the PWM signal $S_{PWM}$ in response to the MSB selection signal MSB_SEL at a logic low level. Since the bit value of the sixth bit D6 is '0', the PWM signal $S_{PWM}$ may be at a second level (e.g., OFF level). The emission device ED may not emit light.

At an end of the sixth bit field BF6, the feedback clock signal $CLK_{FB}$ and the seventh to first clock signals CLK7 to CLK1 may be sequentially toggled. The feedback latch LF may store the sixth bit D6 output from the seventh latch L7 and output the sixth bit D6 to the input selection circuit 15.

Seventh to first latches L7 to L1 may each store and output bits provided from a previous latch according to toggling of a corresponding clock signal. At this time, since the seventh to first clock signals CLK7 to CLK1 are toggled sequentially, the seventh to first latches L7 to L1 may operate sequentially. The seventh latch L7 may store and output the fifth bit D5 provided from a previous latch (e.g., the (n−2)-th latch), and the first latch L1 may store and output a feedback bit, e.g., the sixth bit D6, provided from the input selection circuit 15.

When the seventh latch L7 outputs the fifth bit D5 provided from the previous latch (e.g., the (n−2)-th latch Ln−2), the output selection circuit 13 may output the fifth bit D5 in response to the MSB selection signal MSB_SEL at a logic low level. Therefore, the fifth bit field BF5 may be consecutive to the sixth bit field BF6. Since the bit value of the fifth bit D5 is '1', the PWM signal $S_{PWM}$ may be at a first level (e.g., ON level).

The second sub-field SF2 of the seventh bit field BF7 may be consecutive to the fifth bit field BF5. The MSB selection signal MSB_SEL may transition from a logic low level to a logic high level. The output selection circuit 13 may output the seventh bit D7 output from the storage device 12 as the PWM signal $S_{PWM}$ in response to the MSB selection signal MSB_SEL at a logic high level. Since the bit value of the seventh bit D7 is '1', the PWM signal $S_{PWM}$ may be at a first level (e.g., ON level).

At an end of the second sub-field SF2 of the seventh bit field BF7, the feedback clock signal $CLK_{FB}$ and the seventh to first clock signals CLK7 to CLK1 may be sequentially toggled. The feedback latch LF may store the fifth bit D5 output from the seventh latch L7 and output the fifth bit D5 to the input selection circuit 15.

Seventh to first latches L7 to L1 may each store and output bits provided from a previous latch according to the toggling of a corresponding clock signal. The seventh latch L7 may store and output the fourth bit D4 provided from a previous latch (e.g., the (n−2)-th latch Ln−2), and the first latch L1 may store and output a feedback bit, e.g., the fifth bit D5, provided from the input selection circuit 15.

The seventh latch L7 may output the fourth bit D4, and the MSB selection signal MSB_SEL may transition from a logic high level to a logic low level. The output selection circuit 13 may output the fourth bit D4 as the PWM signal $S_{PWM}$ in response to the MSB selection signal MSB_SEL at a logic low level. The fourth bit field BF4 may be consecutive to the second sub-field SF2. Since the bit value of the fourth bit D4 is '0', the PWM signal $S_{PWM}$ may be at a second level (e.g., OFF level).

As described above, the pixel PXa may generate the PWM signal $S_{PWM}$ based on control signals and clock signals, and the seventh to 0th bits D7 to DO of the pixel data DT may be output to corresponding bit fields as the PWM signal $S_{PWM}$. The seventh bit field BF7 may be divided into a plurality of sub-fields, for example, the first sub-field SF1 and the second sub-field SF2, and distributed in the sub-frame SFRM, and the seventh bit D7 may be output as the PWM signal $S_{PWM}$ in the plurality of sub-fields SF1 and SF2.

Figure 7:
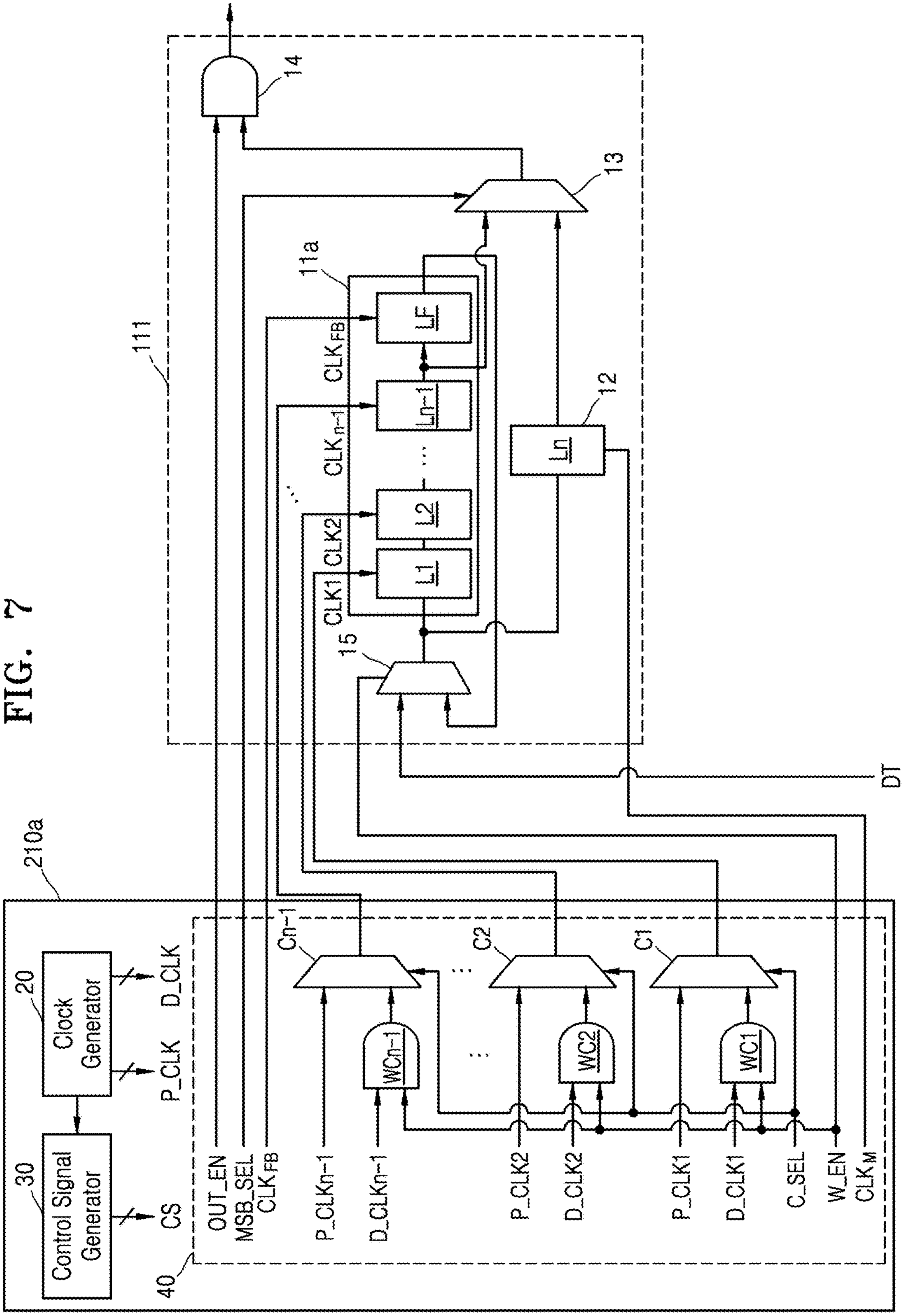
FIG. 7 is a diagram showing an example of a row driver according to an example embodiment.

FIG. 7 is a diagram showing an example of a row driver according to an example embodiment.

A row driver 210*a* may drive the pixel (e.g., PXa of FIG. 5) and may be applied to the row driver 210 of FIG. 1. For convenience of explanation, the PWM circuit 111 in FIG. 5 is also shown.

Referring to FIG. 7, the row driver 210*a* may include the clock generator 20, a control signal generator 30, and a row driving circuit 40. Although only one row driving circuit 40 is shown for convenience of explanation, the row driver 210*a* may include m row driving circuits 40 respectively corresponding to m (m is an integer greater than or equal to 2) rows of the pixel array 100 of FIG. 1.

The clock generator 20 may generate various clock signals used in the row driver 210*a*. According to an example embodiment, the clock generator 20 may generate a write clock signal D_CLK and a PWM clock signal P_CLK. The write clock signal D_CLK and the PWM clock signal P_CLK may be provided to the row driving circuit 40. The clock generator 20 may also generate the feedback clock signal $CLK_{FB}$ and the MSB clock signal $CLK_M$.

The control signal generator 30 may generate control signals CS provided to the row driving circuit 40. For example, the control signal generator 30 may generate the control signals CS based on a source clock signal provided from the clock generator 20. The control signals CS may include the output enable signal OUT_EN, the MSB selection signal MSB_SEL, and the write enable signal W_EN.

The row driving circuit 40 may receive control signals and clock signals and provide the control signals and the clock signals to a corresponding row of the pixel array 100. According to an example embodiment, the row driving circuit 40 may include a plurality of buffers, buffer control signals and clock signals, and output buffered control signals and buffered clock signals.

The row driving circuit 40 may include first to (n−1)-th write clock control logics WC1 to WCn−1 and first to (n−1)-th clock selection circuits C1 to Cn−1. The first to (n−1)-th write clock control logics WC1 to WCn−1 may respectively output first to (n−1)-th data clock signals D_CLK1 to D_CLKn−1 based on the write enable signal W_EN. For example, the first to (n−1)-th write clock control logics WC1 to WCn−1 may be respectively implemented with AND gates and, when the write enable signal W_EN is at a logic high level, the first to (n−1)-th write clock control logics WC1 to WCn−1 may respectively output the first to (n−1)-th data clock signals D_CLK1 to D_CLKn−1.

The first to (n−1)-th clock selection circuits C1 to Cn−1 may selectively output received first to (n−1)-th PWM clock signals P_CLK1 to P_CLKn−1 and the first to (n−1)-th data clock signals D_CLK1 to D_CLKn−1. For example, the first to (n−1)-th clock selection circuits C1 to Cn−1 may respectively output the first to (n−1)-th data clock signals D_CLK1 to D_CLKn−1 in response to the write enable signal W_EN at a logic high level and respectively output the first to (n−1)-th PWM clock signals P_CLK1 to P_CLKn−1 in response to the write enable signal W_EN at a logic low level.

The first to (n−1)-th data clock signals D_CLK1 to D_CLKn−1 or the first to (n−1)-th PWM clock signals P_CLK1 to P_CLKn−1 output from the first to (n−1)-th clock selection circuits C1 to Cn−1 may be provided to corresponding latches from among first to (n−1)-th latches L1 to Ln−1 included in the serial shift circuit 11*a* of the PWM circuit 111 as the first to (n−1)-th clock signals CLK1 to CLKn−1.

Figure 8:
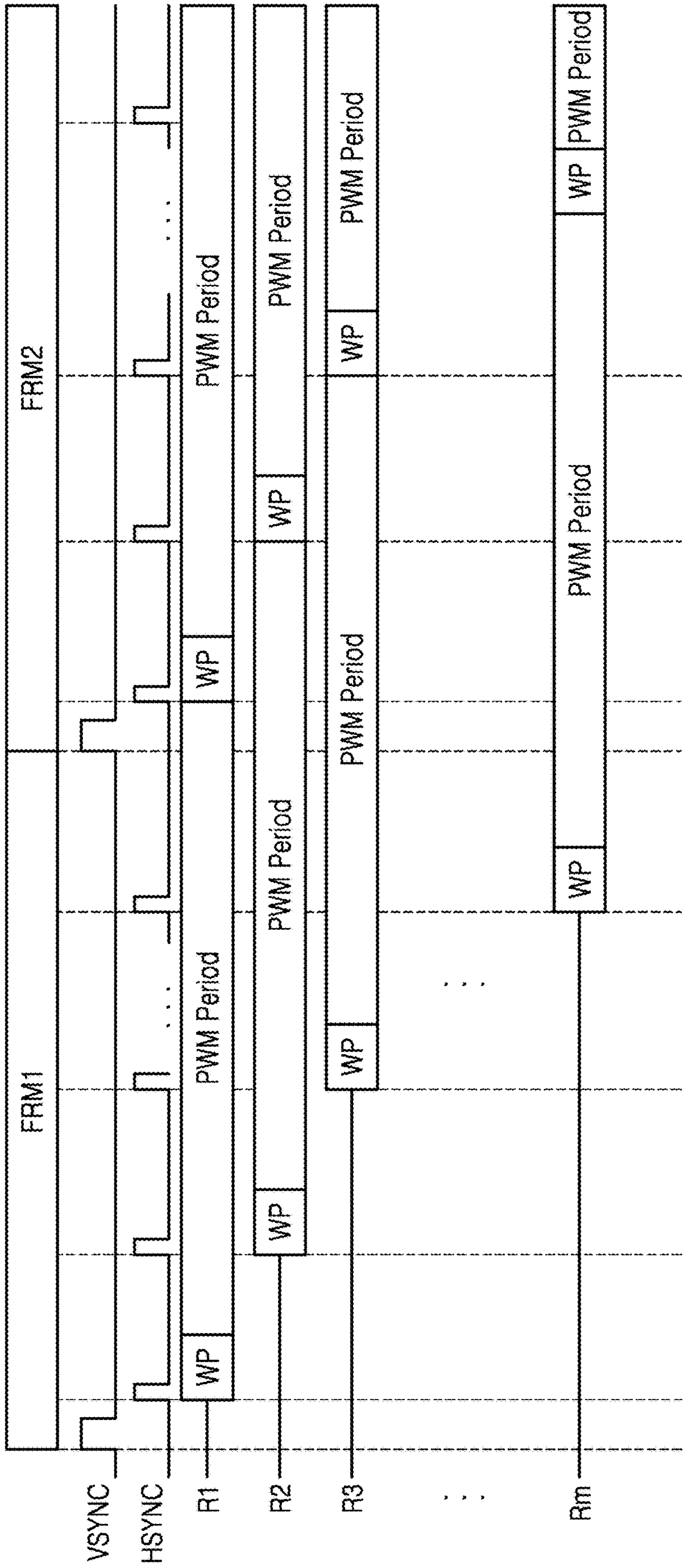
FIG. 8 is a timing diagram illustrating the operation of a display device according to an example embodiment.

FIG. 8 is a timing diagram illustrating the operation of a display device according to an example embodiment.

Referring to FIG. 8, a first period FRM1 and a second period FRM2 may be consecutive. The first frame FRM1 and the second frame FRM2 may be distinguished from each other by a vertical synchronization signal VSYNC (also referred to as a frame synchronization signal). One frame may starts each time the vertical synchronization signal VSYNC is toggled. A horizontal period starts each time a horizontal synchronization signal HSYNC (also referred to as a row sync signal) is toggled. In each horizontal period, a row in which pixel data is written from among a plurality of rows of the pixel array (e.g., 100 of FIG. 1) is changed. For example, after pixel data is written (or stored) in pixels of a first row R1 in one horizontal period, pixel data may be written (or stored) in pixels of a second row R2 in the next horizontal period.

In the first frame FRM1, after the vertical synchronization signal VSYNC is toggled, the horizontal synchronization signal HSYNC may be toggled, and the write period WP and a PWM period of the first row R1 may proceed. During the write period WP, data may be written to pixels arranged in all columns of the first row R1. A PWM period (or referred to as an emission period) of the first row R1 may proceed after the write period WP of the first row R1. The PWM period may include one or more sub-frames. According to the PWM driving method according to the above-described embodiment, a PWM signal corresponding to pixel data stored in a pixel may be generated in every sub-frame.

When the horizontal synchronization signal HSYNC is toggled again during the PWM period of the first row R1, the write period WP and the PWM period (or emission period) of the second row R2 may proceed. In this way, the write period WP and the PWM period may sequentially proceed with respect to the first row R1 to an m-th row Rm of the pixel array 100.

In this way, the first row R1 to the m-th row Rm operate sequentially, and thus row control signals and row clock signals provided to the first row R1 to the m-th row Rm may have a phase difference of one horizontal period. For example, the row driver 210 may generate row control signals and row clock signals to be provided to the first row R1 to the m-th row Rm by delaying reference control signals and reference clock signals by one horizontal period.

When the vertical synchronization signal VSYNC is toggled, the second frame FRM2 starts, and, when the horizontal synchronization signal HSYNC is toggled, new data may be written again to the first row R1. Like the first frame FRM1, the write period WP and the PWM period may sequentially proceed in the first row R1 to the m-th row Rm according to the horizontal synchronization signal HSYNC.

Figure 9:
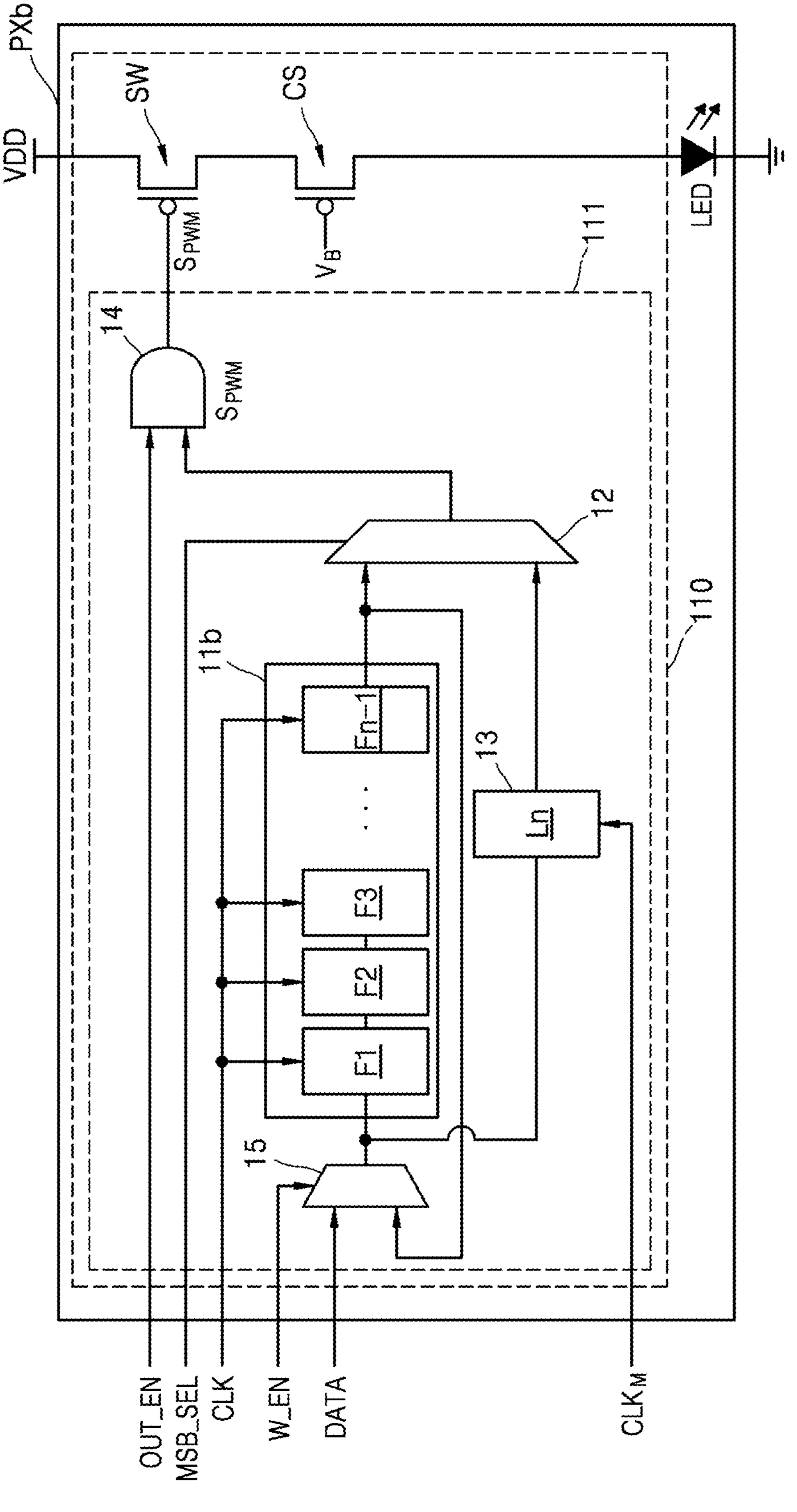
FIG. 9 is a diagram showing a pixel according to an example embodiment.

FIG. 9 is a diagram showing a pixel according to an example embodiment.

A pixel PXb may be applied to the pixel PX of the display device 10 of FIG. 1 and may generate the PWM signal $S_{PWM}$ according to the above-described PWM driving method.

Referring to FIG. 9, the pixel PXb may include the pixel circuit 110 and the emission device ED. According to an example embodiment, the emission device ED may be an LED. The pixel circuit 110 may include the PWM circuit 111, the switch SW, and the current source CS. The PWM circuit 111 may include a serial shift circuit 11*b*, the storage device 12, the output selection circuit 13, the output control logic 14, and the input selection circuit 15.

In the pixel PXb of FIG. 9, operations of components other than the serial shift circuit 11*b* may be identical to operations of the corresponding components in the pixel PXa of FIG. 5. Therefore, descriptions overlapping with those already given above will be omitted.

The serial shift circuit 11*b* may include a plurality of storage devices and may be implemented with a shift register or an n−1 bit memory. For example, the serial shift circuit 11*b* may include first to (n−1)-th flip-flops F1 to Fn−1. When pixel data includes 8 bits of data, the serial shift circuit 11*b* may include 7 flip-flops. The first to (n−1)-th flip-flops F1 to Fn−1 may operate in response to the same clock signal CLK.

The first to (n−1)-th flip-flops F1 to Fn−1 may sequentially store and output the next MSB to the LSB (e.g., a sixth bit to a 0th bit) of the pixel data DT other than the MSB based on the clock signal CLK. According to an example embodiment, the storage device 12 may also be implemented with a flip-flop and may store and output the MSB of the pixel data DT.

Figure 10:
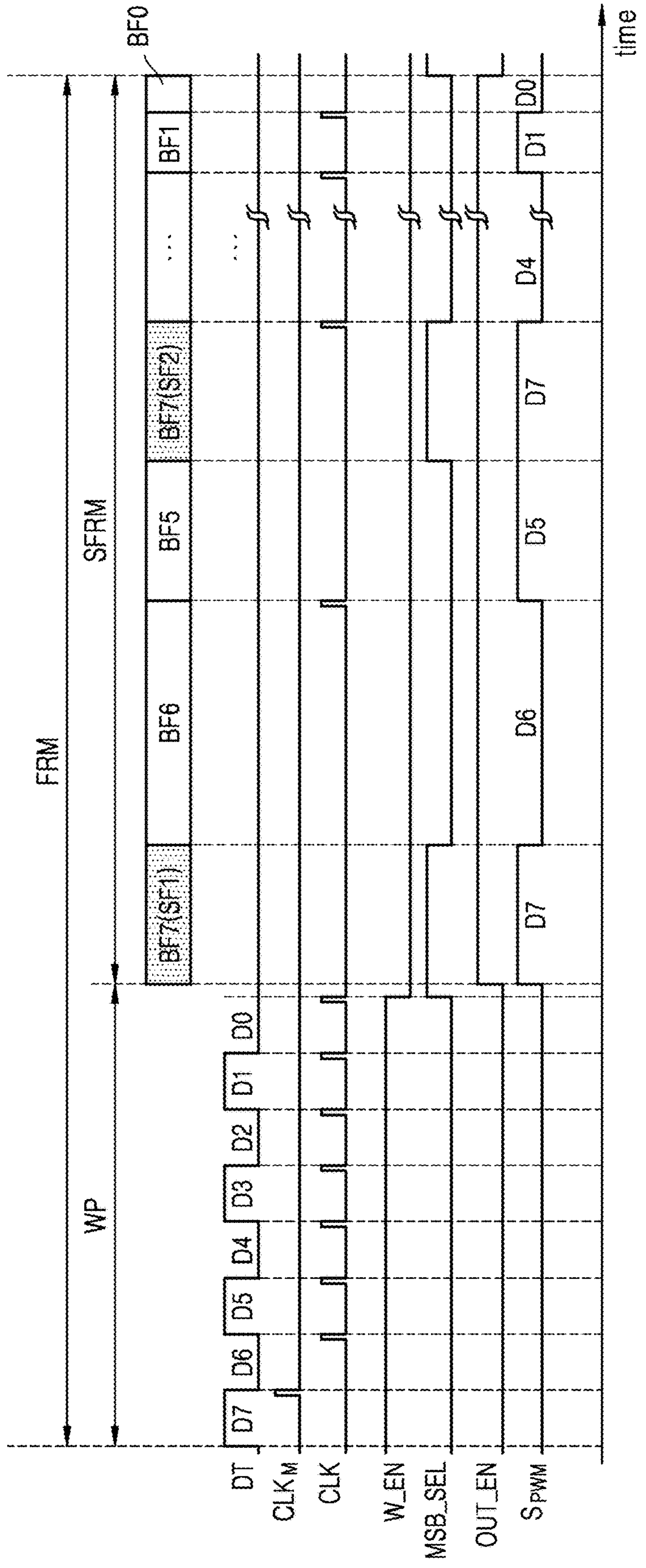
FIG. 10 is a timing diagram of a pixel according to an example embodiment.

FIG. 10 is a timing diagram of a pixel according to an example embodiment.

FIG. 10 shows control signals, clock signals, the pixel data DT, and the PWM signal $S_{PWM}$ input to the pixel PXb of FIG. 9. Descriptions of FIG. 9 will be given below with reference to FIG. 10 together. Here, the control signals may include the write enable signal W_EN, the MSB enable signal MSB_EN, and the output enable signal OUT_EN, and the clock signals may include a clock signal CLK and the MSB clock signal $CLK_M$.

The pixel data DT may be received in the write period WP. For example, the pixel data DT may include 0th to seventh bits DO to D7, and a seventh bit D7 to a 0th bit DO may be sequentially input to the pixel PXb in the order stated.

The write enable signal W_EN may be at a second level (e.g., a logic high level), and the input selection circuit 15 may output received seventh bit D7 to the 0th bit DO in response to the write enable signal W_EN at the second level.

After the input selection circuit 15 outputs the seventh bit D7, the MSB clock signal $CLK_M$ may be toggled, and the storage device 12 may output the seventh bit D7, e.g., the MSB, in response to the MSB clock signal $CLK_M$.

Thereafter, the input selection circuit 15 may sequentially receive and output sixth to 0th bits D6 to DO, and every time the sixth to 0th bits D6 to DO are sequentially received and output, the clock signal CLK may be toggled.

The serial shift circuit 11*b* may store the sixth bit D6 to the 0th bit DO in response to the clock signal CLK and the seventh to first clock signals CLK7 to CLK1. At the end of the write period WP, the sixth bit D6 may be stored in the (n−1)-th flip-flop Ln−1 (hereinafter referred to as a seventh latch), and the 0th bit DO (e.g., the least significant bit) may be stored in a first flip-flop F1. When storage of the seventh bit D7 to the 0th bit DO is completed, the write enable signal W_EN may transition from a logic high level to a logic low level.

The sub-frame SFRM may include the 0th to seventh bit fields BF0 to BF7, wherein the 0th to seventh bit fields BF0 to BF7 may correspond to the 0th bit DO (e.g., the LSB) to the seventh bit D7 (e.g., the MSB) of the pixel data DT, respectively.

The seventh bit field BF7 may be divided into a plurality of sub-fields SF1 and SF2 and distributed in the sub-frame SFRM. Before the first sub-field SF1 starts, the MSB selection signal MSB_SEL may transition from a logic low level to a logic high level. The output selection circuit 13 may output the seventh bit D7 provided from the storage device 12 to the first sub-field SF1, in response to the MSB selection signal MSB_SEL at a logic high level. Therefore, the seventh bit D7 may be output as the PWM signal $S_{PWM}$ in the first sub-field SF1 of the seventh bit field BF7. Since the bit value of the seventh bit D7 is ‘1’, the PWM signal $S_{PWM}$ may be at a first level (e.g., ON level).

The sixth bit field BF6 may be consecutive to the first sub-field SF1, and the MSB selection signal MSB_SEL in the sixth bit field BF6 may transition from a logic high level to a logic low level. The output selection circuit 13 may output the sixth bit D6 output from the seventh latch as the PWM signal $S_{PWM}$ in response to the MSB selection signal MSB_SEL at a logic low level. Since the bit value of the sixth bit D6 is ‘0’, the PWM signal $S_{PWM}$ may be at a second level (e.g., OFF level).

The clock signal CLK maybe toggled at an end of the sixth bit field BF6. In response to the clock signal CLK, first to seventh flip-flops F1 to F7 may store and output input signals. Therefore, 0th to sixth bits DO to D6 stored in the first to seventh flip-flops F1 to F7 may be shifted. The sixth bit D6 may be provided to a first flip-flop F1 through the input selection circuit 15. The fifth bit D5 stored in a sixth flip-flop F6 may be provided to a seventh flip-flop F7, and thus the seventh flip-flop F7 may store and output the fifth bit D5. In this way, 0th to sixth bits DO to D6 may be shifted.

When the seventh flip-flop F7 outputs the fifth bit D5, the output selection circuit 13 may output the fifth bit D5 as the PWM signal $S_{PWM}$ in response to the MSB selection signal MSB_SEL at a logic low level. The fifth bit field BF5 may be consecutive to the sixth bit field BF6. Since the bit value of the fifth bit D5 is '1', the PWM signal $S_{PWM}$ may be at a first level (e.g., ON level).

The second sub-field SF2 of the seventh bit field BF7 may be consecutive to the fifth bit field BF5. The MSB selection signal MSB_SEL may transition from a logic low level to a logic high level. The output selection circuit 13 may output the seventh bit D7 output from the storage device 12 as the PWM signal $S_{PWM}$ in response to the MSB selection signal MSB_SEL at a logic high level. Since the bit value of the seventh bit D7 is '1', the PWM signal $S_{PWM}$ may be at a first level (e.g., ON level).

In this way, the pixel PXb may generate a PWM signal $S_{PWM}$ based on control signals and clock signals, and the seventh bit field BF7 may be divided into a plurality of sub-fields SF1 and SF2 and distributed in the sub-frame SFRM.

Figure 11:
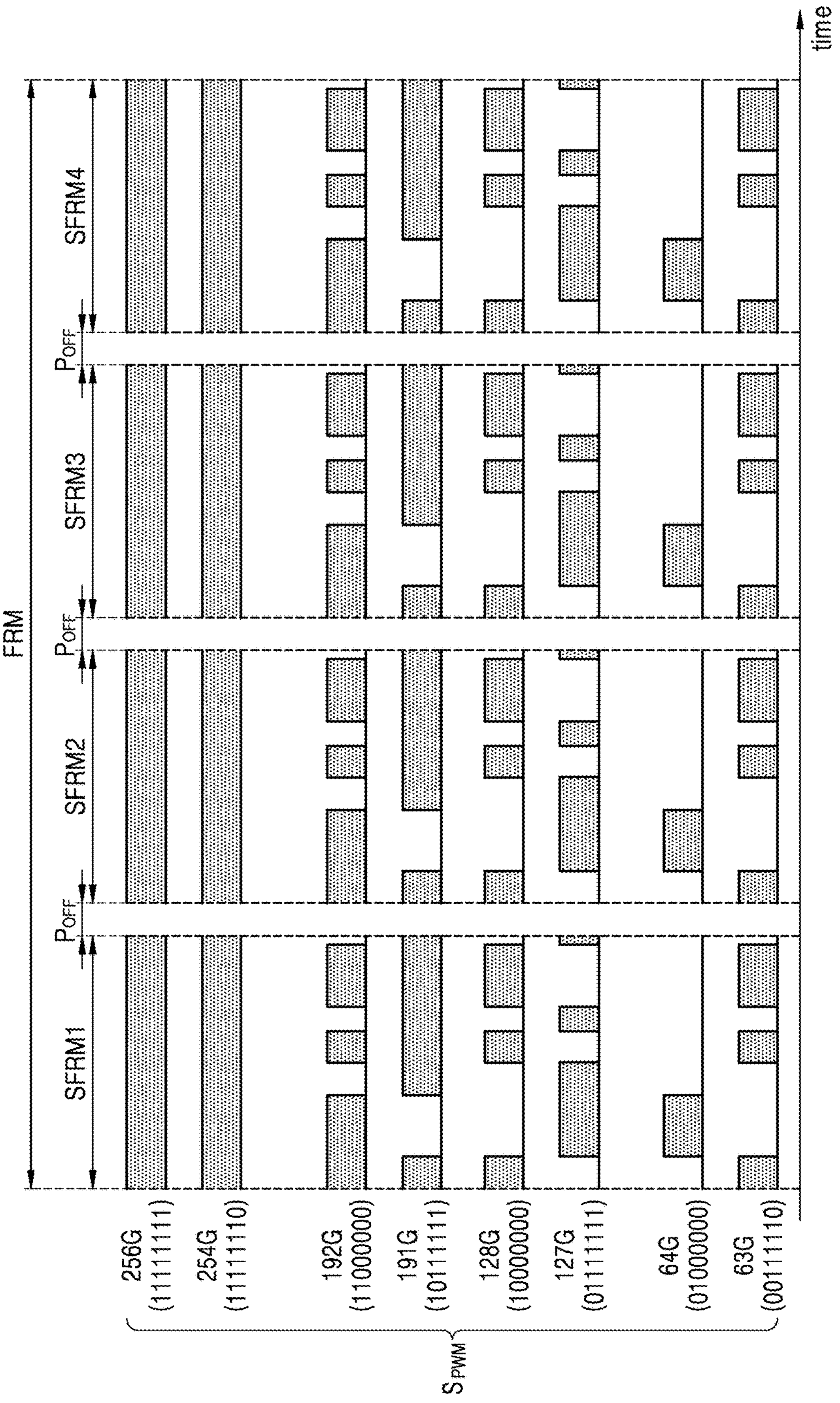
FIG. 11 is a diagram showing a PWM driving method according to an example embodiment.

FIG. 11 is a diagram showing a PWM driving method according to an example embodiment.

In FIG. 11, corresponding waveforms of the PWM signal $S_{PWM}$ when pixel data represents various gradations, such as a gradation 256 256G, a gradation 254 254G, the gradation 192 192G, a gradation 191 191G, the gradation 128 128G, the gradation 127 127G, a gradation 64 64G, and a gradation 63 63G, are shown. The numbers in parentheses indicate bit values of a plurality of bits of the pixel data when each gradation is expressed as binary data.

Referring to FIG. 11, one frame FRM may include a plurality of sub-frames, e.g., first to fourth sub-frames SFRM1 to SFRM4. As described above with reference to FIG. 8, the frame FRM further may include a write period (not shown) before the first to fourth sub-frames SFRM1 to SFRM4. During the write period, pixels may store pixel data and repeatedly generate the PWM signal $S_{PWM}$ corresponding to the pixel data in the first to fourth sub-frames SFRM1 to SFRM4. An emission device of a pixel may or may not emit light based on the PWM signal $S_{PWM}$.

According to the PWM driving method according to an example embodiment, the MSB field corresponding to the MSB of the pixel data may be divided into a plurality of sub-fields, and the plurality of sub-fields may be distributed in a sub-frame. Therefore, the ON level period of the PWM signal $S_{PWM}$ may be distributed in each sub-frame even at particular specific gradations such as the gradation 192 192G, the gradation 128 128G, and the gradation 127 127G.

According to the present embodiment, PWM OFF periods $P_{OFF}$ may be distributed among the first to fourth sub-frames SFRM1 to SFRM4, and output of the PWM signal $S_{PWM}$ may be blocked during a PWM off period OFF. For example, during the PWM OFF period $P_{OFF}$, the output enable signal OUT_EN of FIGS. 5 and 9 may be at a logic low level, and the output control logic 14 may block the PWM signal $S_{PWM}$ from being output in response to the output enable signal OUT_EN at a logic low level. For example, during the PWM OFF period $P_{OFF}$, the PWM signal $S_{PWM}$ may be at an OFF level. During the PWM OFF period $P_{OFF}$, the switch SW may be turned on, and thus the emission device ED may not emit light.

In this way, as the PWM signal $S_{PWM}$ is blocked in the PWM OFF periods $P_{OFF}$ between the first to fourth sub-frames SFRM1 to SFRM4, the ON level period of the PWM signal $S_{PWM}$ may be distributed within the frame FRM. Therefore, the on-level periods of the PWM signal $S_{PWM}$ during the frame FRM may be prevented from continuing for a long time.

Figure 12:
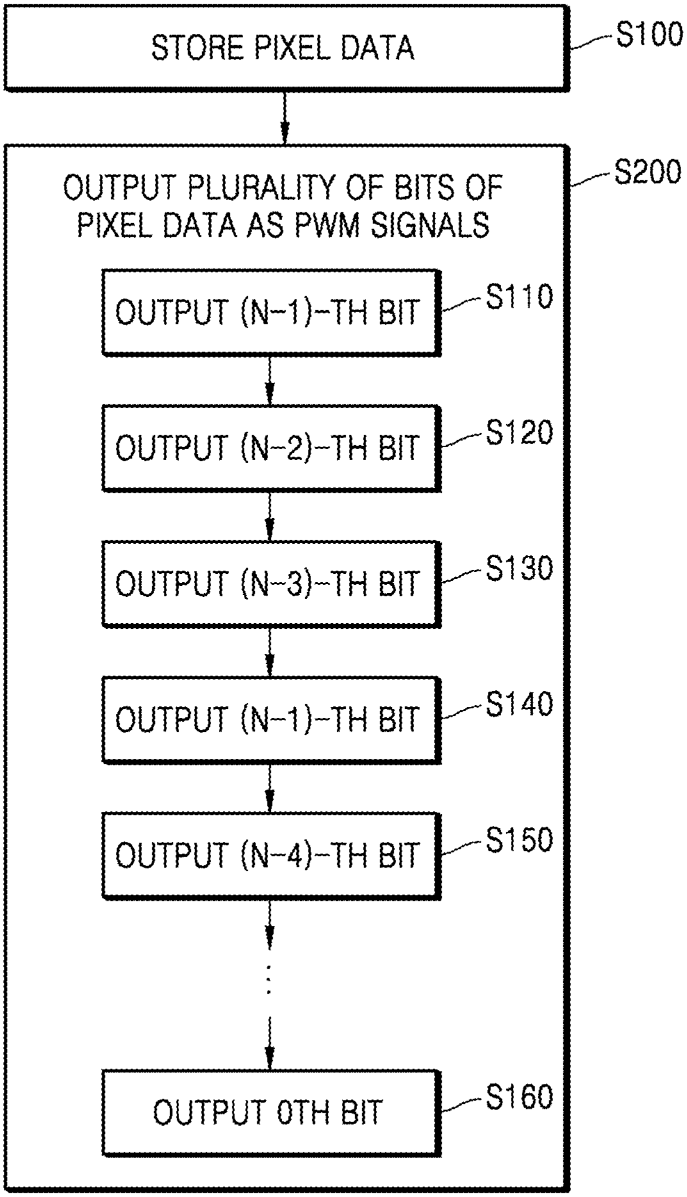
FIG. 12 is a flowchart of a method of operating a pixel, according to an example embodiment.

FIG. 12 is a flowchart of a method of operating a pixel, according to an example embodiment. The method of FIG. 12 may be applied to the pixel PX provided in the pixel array 100 of FIG. 1. Therefore, the above-described PWM driving method may also be applied to the present embodiment.

Referring to FIG. 12, a pixel may store pixel data received through a data line during a write period (operation S100). The pixel data may include a plurality of bits, and the plurality of bits may be sequentially received through a data line. The pixel may include a storage device that stores the MSB of the pixel data from among the plurality of bits of the pixel data and a serial shift circuit that stores the other bits. The serial shift circuit may include a plurality of storage devices, and the plurality of storage devices may each store one bit of bits other than the MSB of the pixel data. The pixel may store the MSB in the storage device and store the other bits in the serial shift circuit.

The pixel may output the plurality of bits of pixel data as a PWM signal during a sub-frame, e.g., an emission period (operation S200). The pixel may include an output selection circuit configured to selectively output one of bits provided from the serial shift circuit and the MSB provided from the storage device as a PWM signal, and the output selection circuit may output the MSB or one of the other bits as a PWM signal based on a received selection signal.

For example, pixel data may include n bits from a 0th bit to an (n−1)-th bit (n is an integer greater than or equal to 2). A sub-frame may include a plurality of bit fields corresponding to the 0th bit to the (n−1)-th bit. At this time, an (n−1)-th bit field (e.g., MSB field) of the PWM signal corresponding to the MSB, e.g., an (n−1)-th bit, of the pixel data may be divided into a plurality of sub-fields, and at least one sub-field from among the plurality of sub-fields may be disposed between other bit fields of the PWM signal. In other words, the (n−1)-th bit field may be scrambled in other bit fields of the PWM signal.

The output selection circuit may output the (n−1)-th bit, e.g., the MSB, of the pixel data in a first sub-period (operation S110). The first sub-period may correspond to a first sub-field of the (n−1)-th bit field of the PWM signal.

The output selection circuit may output the (n−2)-th bit, e.g., the next MSB, of the pixel data in a second sub-period (operation S120). The second sub-period may correspond to an (n−2)-th bit field of the PWM signal.

The output selection circuit may output an (n−3)-th bit of the pixel data in a third sub-period (operation S130). The (n−3)-th bit may be a less significant bit adjacent to the (n−2)-th bit. The third sub-period may correspond to an (n−3)-th bit field of the PWM signal.

The output selection circuit may output the (n−1)-th bit in a fourth sub-period (operation S140). The fourth sub-period may correspond to a second sub-field of the (n−1)-th bit field of the PWM signal.

The output selection circuit may output the (n−4)-th bit of the pixel data in a fifth sub-period (operation S150). The (n−4)-th bit may be a less significant bit adjacent to the (n−3)-th bit.

The output selection circuit may output the 0th bit, e.g., the least significant bit, of the pixel data in a p-th sub-period (p is an integer greater than n) (operation S160). Here, when the (n−1)-th bit field is divided into three sub-fields, the p-th sub-period may be an (n+2)-th sub-period. In this way, a plurality of bits of pixel data from the (n−1)-th bit to the 0th bit may be output as PWM signals, and the (n−1)-th bit may be output a plurality of number of times.

In this way, the MSB may be scrambled with other bits and output as a PWM signal during the emission period. According to the method of operating the pixel in an example embodiment, the false contour effect may be prevented from occurring in images displayed on the pixel array, and thus image quality deterioration due to the false contour effect may be prevented.

Figure 13:
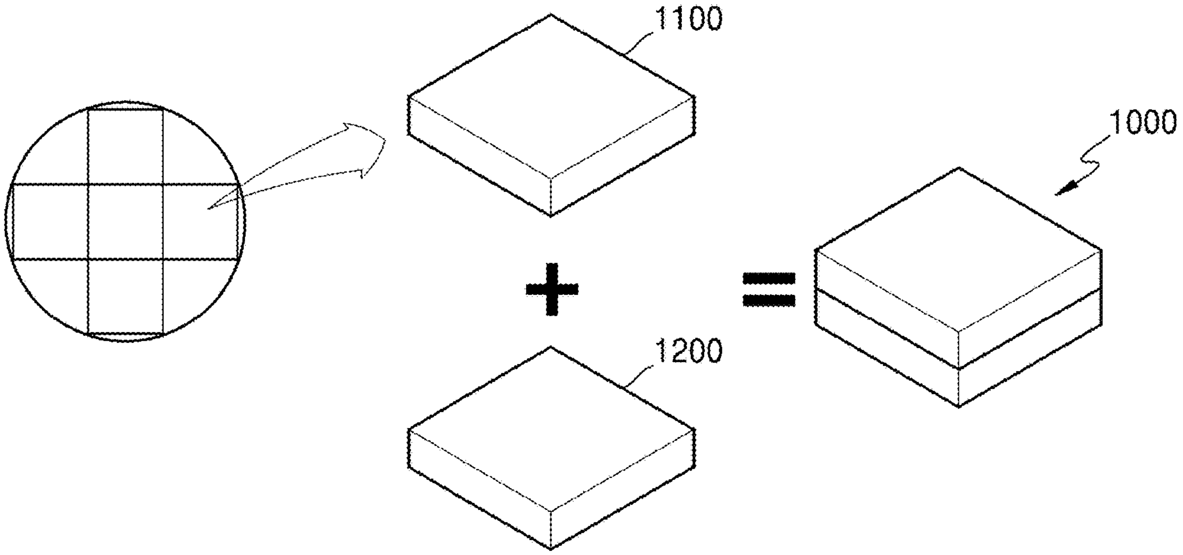
FIG. 13 is a diagram schematically showing a process of manufacturing a display device according to an example embodiment.

FIG. 13 is a diagram schematically showing a process of manufacturing a display device according to an example embodiment.

Referring to FIG. 13, a display device 1000 according to an example embodiment may include an emission device array 1100 and a driving circuit board 1200.

The emission device array 1100 may include a plurality of emission devices. The emission device may be a light-emitting diode (LED). The emission device may be a LED having a micro-size to a nanoscale size. For example, the size of the emission device may be 100 micrometers (m) or less. At least one emission device array 1100 may be manufactured by growing a plurality of LEDs on a semiconductor wafer (silicon wafer). Therefore, the display device 1000 may be manufactured by combining the emission device array 1100 with the driving circuit board 1200 without the need to individually transfer LEDs to the driving circuit board 1200.

Pixel circuits corresponding to respective LEDs on the emission device array 1100 may be arranged on the driving circuit board 1200, and a driving circuit may also be formed. LEDs on the emission device array 1100 and the pixel circuit on the driving circuit board 1200 may be electrically connected to each other, thereby forming the pixel PX.

While the disclosure has been particularly shown and described with reference to example embodiments thereof, it will be understood that various changes in form and details may be made therein without departing from the spirit and scope of the following claims.

What is claimed is:

1. A display device comprising:

a pixel array comprising a plurality of pixels arranged in a matrix, wherein each pixel of the plurality of pixels comprises a pulse width modulation (PWM) circuit configured to generate a PWM signal and an emission device configured to emit a light based on an ON level of the PWM signal;

a data driver configured to provide pixel data to pixels arranged in a row of the pixel array; and a row driver configured to generate control signals and clock signals for driving the pixel array, wherein the PWM circuit is configured to generate the PWM signal based on the control signals and the clock signals, the PWM signal including a plurality of bit fields respectively corresponding to a plurality of bits of the pixel data; and wherein the PWM circuit is further configured to, in a PWM period in which the PWM signal is output, distribute a first bit field of the PWM signal corresponding to a most significant bit (MSB) of the pixel data, among the plurality of bit fields, wherein the PWM circuit comprises:

a current source configured to generate a driving current to be provided to the emission device;

a storage device configured to store the MSB;

a serial shift circuit configured to store lower bits other than the MSB from among the plurality of bits and sequentially output the lower bits based on a PWM clock signal; and a selection circuit configured to selectively select an output of the storage device or an output of the serial shift circuit as the PWM signal.

2. The display device of claim 1, wherein the PWM circuit is further configured to divide the first bit field into two or more sub-fields, and dispose at least one sub-field of the two or more sub-fields between lower bit fields of the PWM signal corresponding to the lower bits other than the MSB from among the plurality of bits.

3. The display device of claim 2, wherein the PWM circuit is further configured to dispose a third bit field corresponding to a third bit of the pixel data to be consecutive to a second bit field corresponding to a second bit of the pixel data; and dispose one of the two or more sub-fields between the third bit field and a fourth bit field corresponding to a fourth bit of the pixel data, the second bit being next to the MSB, the third bit being next to the second bit, and the fourth bit being next to the third bit, in the pixel data.

4. The display device of claim 2, wherein the PWM circuit is further configured to dispose one sub-field from among the two or more sub-fields at a beginning of the PWM period.

5. The display device of claim 2, wherein one frame period includes a plurality of sub-frames, each sub-frame of the plurality of sub-frames comprises the two or more sub-fields, and wherein the PWM circuit is further configured to block an output of the PWM signal between the plurality of sub-frames.

6. The display device of claim 1, wherein a length of an (N+1)-th bit field corresponding to an N-th bit from the MSB (N being an integer greater than or equal to 1) from among the plurality of bits is twice a length of an (N+2)-th bit field corresponding to an (N+1)-th bit from the MSB, and a length of the first bit field is longest from among lengths of the plurality of bit fields.

7. The display device of claim 1, wherein the serial shift circuit comprises a plurality of latches.

8. The display device of claim 1, wherein the PWM clock signal is toggled according to a period corresponding to a length of each of the plurality of bit fields.

9. The display device of claim 1, wherein the serial shift circuit comprises a feedback bit storage device configured to store a bit output from the selection circuit, and wherein the PWM circuit further comprise:

a multiplexer configured to selectively provide a feedback bit provided from the feedback bit storage device or the pixel data to the serial shift circuit; and a logic gate configured to output the PWM signal provided from the selection circuit based on an output enable signal being at an active level.

10. The display device of claim 1, wherein the emission device comprises a light emitting diode (LED), and a size of the LED is 100 micrometers or less.

11. A driving circuit for driving a pixel array comprising a plurality of pixels, the driving circuit comprising:

a data driver configured to provide pixel data to the plurality of pixels; and a row driver configured to generate and provide clock signals and control signals to the pixel array and control a pixel of the plurality of pixels based on the clock signals and the control signals, such that a bit field corresponding to a most significant bit (MSB) of the pixel data from among a plurality of bit fields included in a luminance control signal of the pixel scrambles between two or more lower bit fields among bit fields corresponding to remaining bits of the pixel data, wherein each pixel of the plurality of pixels comprises a pulse width modulation (PWM) circuit configured to generate a PWM signal and an emission device configured to emit a light based on an ON level of the PWM signal, and wherein the PWM circuit comprises:

a current source configured to generate a driving current to be provided to the emission device;

a storage device configured to store the MSB;

a serial shift circuit configured to store lower bits other than the MSB from among a plurality of bits of the pixel data and sequentially output the lower bits based on a PWM clock signal; and a selection circuit configured to selectively select an output of the storage device or an output of the serial shift circuit as the PWM signal.

12. The driving circuit of claim 11, wherein the row driver is further configured to provide, to the pixel array, a first clock signal used by the pixel to store the MSB, one or more second clock signals used by the pixel to store the remaining bits, and an output selection signal to control to output one of the remaining bits and the MSB as the luminance control signal, and wherein the MSB is output as the luminance control signal during a period in which the output selection signal is at a first level, and the remaining bits are output as the luminance control signal during a period in which the output selection signal is at a second level.

13. The driving circuit of claim 12, wherein the row driver is further configured to generate a data clock signal and a pulse width modulation (PWM) clock signal, output the data clock signal as the one or more second clock signals in a write period, and output the PWM clock signal as the one or more second clock signals during a PWM period.

14. The driving circuit of claim 11, wherein the row driver is further configured to generate and provide an output enable signal to the pixel array, and wherein the luminance control signal is blocked from being output during a partial period of a PWM period of the pixel, based on the output enable signal.

15. A method of operating a pixel provided in a pixel array of a display device, the pixel comprising a pulse width modulation (PWM) circuit and an emission device, the method comprising:

in a first period, storing received pixel data; and in a second period, outputting a plurality of bits of the pixel data as a pulse width modulation (PWM) signal, based on which an emission and a non-emission of the emission device are controlled, wherein, in the second period, a most significant bit (MSB) from among the plurality of bits is output a plurality of number of times, and each of bits other than the MSB from among the plurality of bits is output once, wherein the PWM circuit comprises:

a current source configured to generate a driving current to be provided to the emission device;

a storage device configured to store the MSB;

a serial shift circuit configured to store lower bits other than the MSB from among the plurality of bits and sequentially output the lower bits based on a PWM clock signal; and a selection circuit configured to selectively select an output of the storage device or an output of the serial shift circuit as the PWM signal.

16. The method of claim 15, wherein the outputting the plurality of bits as the PWM signal comprises:

outputting the MSB in a first sub-period of the second period;

outputting a first bit from among the bits other than the MSB in a second sub-period of the second period;

outputting a second bit from among the bits other than the MSB in a third sub-period of the second period; and outputting the MSB in a fourth sub-period of the second period, and wherein the first bit is a bit next to the MSB, and the second bit is a bit next to the first bit.

17. The method of claim 16, wherein the outputting of the plurality of bits as the PWM signal further comprises outputting a third bit from among the bits other than the MSB in a fifth sub-period of the second period.

18. The method of claim 15, wherein a total length of a plurality of sub-periods of the second period, in which the MSB is output the plurality of number of times, corresponds to half a length of the second period.

19. The method of claim 15, further comprising:

blocking an output of the PWM signal in a third period, subsequent to the second period; and outputting the plurality of bits of the pixel data as the PWM signal again in a fourth period, subsequent to the third period.

* * * * *